United States Patent
Bobeck et al.

(10) Patent No.: US 12,012,366 B2
(45) Date of Patent: *Jun. 18, 2024

(54) AGRICULTURAL COMPOSITIONS AND METHODS FOR MAKING AND USING THE SAME

(71) Applicant: Koch Agronomic Services, LLC, Wichita, KS (US)

(72) Inventors: Drew R. Bobeck, Decatur, GA (US); Ahmed A. Iman, Clarkston, GA (US); Stacey Leigh Wertz, Conyers, GA (US)

(73) Assignee: Koch Agronomic Services, LLC, Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,464

(22) Filed: Jun. 30, 2023

(65) Prior Publication Data

US 2023/0348337 A1 Nov. 2, 2023

Related U.S. Application Data

(63) Continuation of application No. 17/959,448, filed on Oct. 4, 2022.

(60) Provisional application No. 63/251,697, filed on Oct. 4, 2021.

(51) Int. Cl.
| | | |
|---|---|---|
| *C05C 9/02* | (2006.01) | |
| *C05C 3/00* | (2006.01) | |
| *C05G 3/90* | (2020.01) | |
| *C05G 5/20* | (2020.01) | |

(52) U.S. Cl.
CPC ............... *C05C 9/02* (2013.01); *C05C 3/00* (2013.01); *C05G 3/90* (2020.02); *C05G 5/20* (2020.02)

(58) Field of Classification Search
None
See application file for complete search history.

(56) References Cited

U.S. PATENT DOCUMENTS

| | | |
|---|---|---|
| 9,266,789 B2 | 2/2016 | Ortiz-Suarez et al. |
| 9,394,210 B2 | 7/2016 | Gabrielson et al. |
| 9,440,890 B2 | 9/2016 | Gabrielson et al. |
| 9,637,420 B2 | 5/2017 | McKnight et al. |
| 9,650,306 B2 | 5/2017 | McKnight et al. |

(Continued)

FOREIGN PATENT DOCUMENTS

WO 2020/100032 A1 5/2020

OTHER PUBLICATIONS

International search report and written opinion received for PCT application No. PCT/IB2022/059470, mailed on Dec. 23, 2022, 12 pages.

*Primary Examiner* — Wayne A Langel

(57) ABSTRACT

The disclosure relates to an agricultural composition comprising paraformaldehyde, a nitrification inhibitor, urea, an ammonia source, or a combination thereof and one or more reaction products prepared from paraformaldehyde, a nitrification inhibitor, urea, an ammonia source, and optionally a solvent, wherein the one or more reaction products is present in an amount of at least 20 wt. % of the total weight of the agricultural composition. Also discloses is a fertilizer composition comprising the agricultural composition and a nitrogen source. Further disclosed are processes for preparing an agricultural composition.

28 Claims, 1 Drawing Sheet

(56) References Cited

U.S. PATENT DOCUMENTS

| | | | |
|---|---|---|---|
| 9,725,372 | B2 | 8/2017 | Barr et al. |
| 9,732,008 | B2 | 8/2017 | McKnight et al. |
| 9,790,136 | B2 | 10/2017 | Gabrielson et al. |
| 9,834,487 | B2 | 12/2017 | Bobeck et al. |
| 10,125,056 | B2 | 11/2018 | Gabrielson et al. |
| 10,173,935 | B2 | 1/2019 | Ionnotta et al. |
| 10,196,322 | B2 | 2/2019 | McKnight et al. |
| 10,221,108 | B2 | 3/2019 | McKnight et al. |
| 10,239,799 | B2 | 3/2019 | Gabrielson et al. |
| 10,273,194 | B2 | 4/2019 | McKnight et al. |
| 10,336,660 | B2 | 7/2019 | Liu et al. |
| 10,421,693 | B2 | 9/2019 | Barr et al. |
| 10,435,333 | B2 | 10/2019 | Ortiz-Suarez et al. |
| 10,479,737 | B2 | 11/2019 | Barr et al. |
| 10,487,019 | B2 | 11/2019 | Bobeck et al. |
| 10,501,383 | B2 | 12/2019 | Gabrielson et al. |
| 10,556,836 | B2 | 2/2020 | Ionnotta et al. |
| 10,562,828 | B2 | 2/2020 | Liu et al. |
| 10,570,068 | B2 | 2/2020 | Liu et al. |
| 10,633,300 | B2 | 4/2020 | McKnight et al. |
| 10,654,760 | B2 | 5/2020 | McKnight et al. |
| 10,689,308 | B2 | 6/2020 | Ionnotta et al. |
| 10,934,228 | B2 | 3/2021 | Ortiz-Suarez et al. |
| 10,947,168 | B2 | 3/2021 | McKnight et al. |
| 10,954,172 | B2 | 3/2021 | Liu et al. |
| 10,974,999 | B2 | 4/2021 | McKnight et al. |
| 11,028,024 | B2 | 6/2021 | Gabrielson et al. |
| 11,130,717 | B2 | 9/2021 | Barr et al. |
| 11,148,982 | B2 | 10/2021 | Gabrielson et al. |
| 11,180,425 | B2 | 11/2021 | McKnight et al. |
| 11,198,652 | B2 | 12/2021 | McKnight et al. |
| 11,208,361 | B2 | 12/2021 | McKnight et al. |
| 11,214,527 | B2 | 1/2022 | McKnight et al. |
| 11,312,667 | B2 | 4/2022 | McKnight et al. |
| 11,414,359 | B2 | 8/2022 | McKnight et al. |
| 11,440,854 | B2 | 9/2022 | Mcknight et al. |
| 11,554,997 | B2 | 1/2023 | McKnight et al. |
| 2011/0296886 | A1 | 12/2011 | Gabrielson et al. |
| 2013/0145806 | A1 | 6/2013 | Ionnotta et al. |
| 2014/0174140 | A1 | 6/2014 | Ortiz-Suarez et al. |
| 2015/0315092 | A1 | 11/2015 | McKnight et al. |
| 2016/0107947 | A1 | 4/2016 | McKnight et al. |
| 2017/0050895 | A1 | 2/2017 | Ortiz-Suarez et al. |
| 2017/0137335 | A1* | 5/2017 | Barr .................. C05G 5/27 |
| 2017/0240483 | A1 | 8/2017 | McKnight et al. |
| 2017/0283340 | A1 | 10/2017 | Patil et al. |
| 2017/0297970 | A1 | 10/2017 | McKnight et al. |
| 2017/0305807 | A1 | 10/2017 | Ionnotta et al. |
| 2018/0002246 | A1 | 1/2018 | Liu et al. |
| 2018/0016200 | A1 | 1/2018 | Gabrielson et al. |
| 2018/0044256 | A1 | 2/2018 | McKnight et al. |
| 2018/0282239 | A1 | 10/2018 | Bobeck et al. |
| 2018/0319716 | A1* | 11/2018 | McKnight .............. C05C 1/00 |
| 2019/0202754 | A1 | 7/2019 | Mcknight et al. |
| 2020/0024205 | A1* | 1/2020 | McKnight ............. C05C 3/00 |
| 2020/0177384 | A1 | 6/2020 | Iyer et al. |
| 2021/0340074 | A1 | 11/2021 | Gabrielson et al. |
| 2021/0403393 | A1 | 12/2021 | Barr et al. |

* cited by examiner

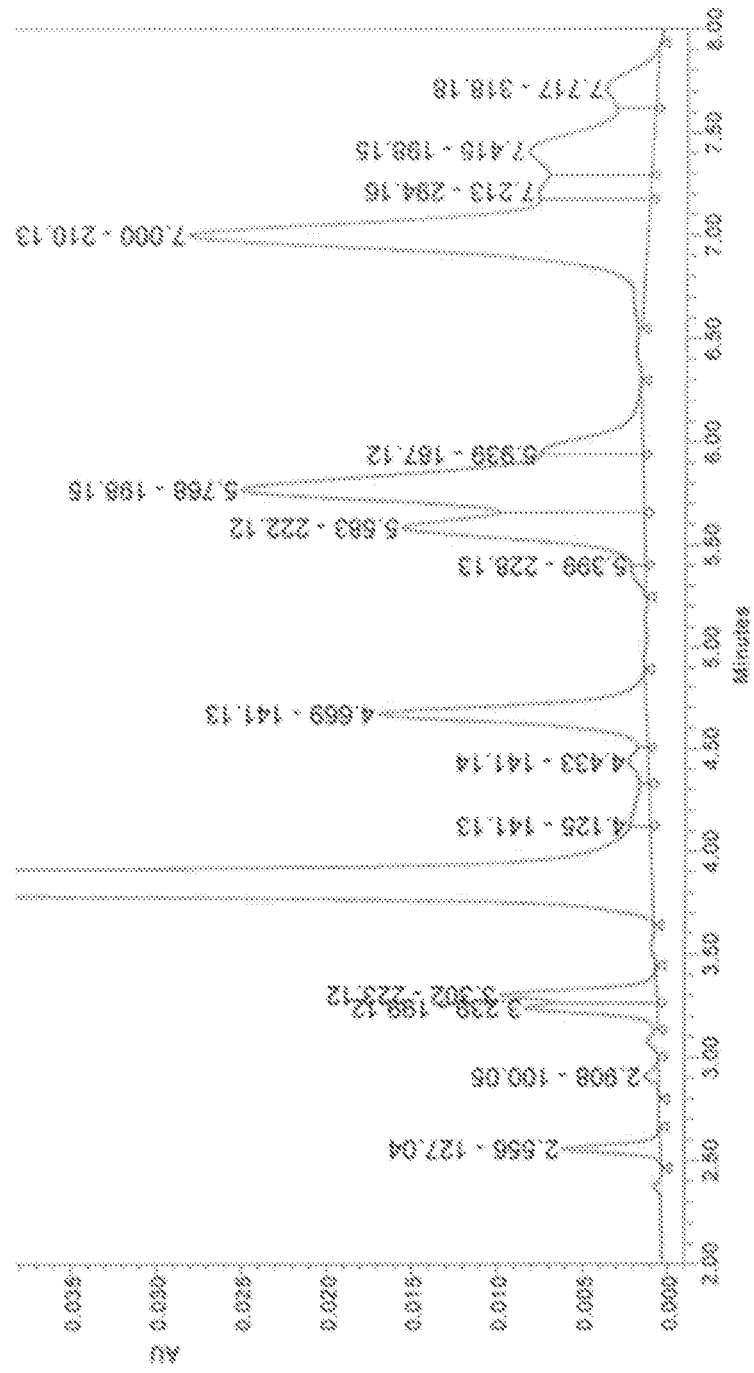

AGRICULTURAL COMPOSITIONS AND METHODS FOR MAKING AND USING THE SAME

RELATED APPLICATIONS

This application is a continuation of U.S. application Ser. No. 17/959,448, filed on Oct. 4, 2022, and claims priority to U.S. Provisional Application No. 63/251,697, filed on Oct. 4, 2021, all of which are incorporated herein by reference in their entirety.

FIELD

The present disclosure relates to an agricultural composition comprising a relatively high concentration of one or more reaction products, also referred to as adducts or active ingredients, prepared from paraformaldehyde, a nitrification inhibitor, urea, an ammonia source, and optionally a solvent. For example, the agricultural composition contains at least 20 wt. % of the reaction products based on the total weight of the agricultural composition. The present disclosure also includes a fertilizer composition comprising the agricultural composition and a nitrogen source. The compositions of the present disclosure have multiple benefits, including improved efficiency and workability and low water content. Further disclosed are processes for preparing an agricultural composition and fertilizer composition according to the present disclosure.

Fertilizers may include any source of urea, ammonia, ammonium nitrate, or a mixture thereof to provide a source of nitrogen, which is a vital nutrient for plant growth. If urea is used as a nitrogen source in a fertilizer, urease, an enzyme produced by numerous fungi and bacteria found in the soil, may hydrolyze the urea to ammonia. Ammonia may rapidly ionize in soil to form ammonium. Ammonium, such as in ammonium nitrate, may oxidize to nitrate ($NO_3^-$) via a sequence of bacterial oxidation reactions, which is commonly referred to as "nitrification." Nitrification of the ammonium, however, may happen so fast that a large percentage of the nitrogen in the fertilizer may be lost before the plants can utilize it.

Nitrogen in the ammonia form may also be lost from soil through volatilization to the atmosphere. Nitrate may also be lost through leaching into the subsoil by rainwater and/or through denitrification, i.e., bacterial conversion of nitrate to elemental nitrogen.

Nitrogen loss may be reduced by using urease inhibitors and/or nitrification inhibitors. Urease inhibitors are compounds capable of inhibiting the catalytic activity of the urease enzyme on urea in the soil. Nitrification inhibitors are compounds capable of inhibiting the bacterial oxidation of ammonium to nitrate in the soil. Nitrification inhibitors themselves may leach into the soil, away from the plant, reducing nitrification inhibition near the plant where it is needed. Nitrification inhibitors may act by temporarily binding the active site (or near the active site) of the enzyme Ammonia monooxygenase in the bacteria *Nitrosomonas Europaea*. When this binding is temporary, these nitrification inhibitors are considered reversible inhibitors and may not lead to the death of the bacteria. In some embodiments of the present disclosure, the nitrification inhibitors are reversible inhibitors. These inhibitors slow nitrification, but do not completely stop it, leading to nitrogen availability that mimics the nitrogen needs of a growing plant.

Compositions that contain a urease inhibitor and/or a nitrification inhibitor can be used to extend the useful lifetime of nitrogen in the soil. Such compositions may be added to a nitrogen source before application to the soil or may be applied to the soil directly, where a nitrogen source has already been applied. Urease inhibitors and/or nitrification inhibitors may also be used in agricultural compositions in the form of adducts. Adducts are described, for example, in U.S. Pat. Nos. 9,440,890, 10,239,799, 10,125,056, 9,725,372, 10,421,693, and 10,479,737. CENTURO® is a commercial nitrogen stabilizer composition that contains as its active ingredient Pronitridine (CAS RN 1373256-33-7). Pronitridine is identified as a reaction product of urea with ammonium hydroxide, N-cyanoguanidine and formaldehyde. CENTURO® contains 14% of the Pronitridine active ingredient and 86% of other components. Due to its relatively low level of active ingredient, CENTURO® is designed to be used with gaseous and liquid nitrogen fertilizers. Required application levels are too high for CENTURO® to be useful as an additive to solid fertilizers, such as urea or ammonium nitrate solid fertilizers.

The ease of using and efficacy of an agricultural composition that contains adducts depends on multiple properties such as concentration, viscosity, and water content. For example, concentrated agricultural compositions may have certain advantages in, e.g., transportation, storage, and use on an industrial scale. Furthermore, it may be desirable to use an agricultural composition to coat a solid nitrogen source, such as urea, to obtain a uniformly coated urea product that has the same or similar crush strength, flowability, and non-caking properties as uncoated solid fertilizer. Additionally, it is desirable for such treatments for solid nitrogen sources to not be "sticky" so that the flow of solid particles is maintained for both freshly treated material and treated material stored in both open and closed environments. This also reduces the likelihood of buildup on fertilizer application equipment.

Accordingly, there is a need for improved agricultural compositions comprising nitrification-inhibiting adducts that provide an extended period of nitrification inhibition and methods for making and using the same. There is also a need for high concentration agricultural compositions that may also have low water content and low viscosity. Such improved agricultural compositions allow for coated urea fertilizers with beneficial properties such as good crush strength, flowability, and that are non-caking.

The present disclosure relates to agricultural compositions comprising one or more reaction products prepared from paraformaldehyde, a nitrification inhibitor, urea, an ammonia source, and optionally a solvent, wherein the one or more reaction products are present in an amount of at least 20 wt. % of the total weight of the agricultural composition.

The agricultural compositions of the present disclosure may also comprise paraformaldehyde, a nitrification inhibitor, urea, an ammonia source, optionally a solvent, or a combination thereof in their unreacted forms that are not part of the reaction product. In certain embodiments, the unreacted nitrification inhibitor is present in at least 7 wt. % of the agricultural compositions, such as in an amount ranging from about 7 wt. % to about 15 wt. %. In at least one embodiment, the unreacted nitrification inhibitor is present in an amount ranging from about 10 wt. % to about 15 wt. %.

In at least one embodiment, the nitrification inhibitor is dicyandiamide.

In some embodiments, the one or more reaction products is a compound of Formula (I).

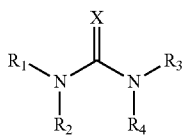

Formula (I)

In Formula (I), X is O or

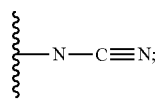

$R_1$, $R_2$, $R_3$, and $R_4$ are each independently:

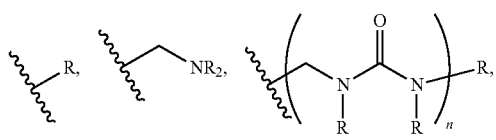

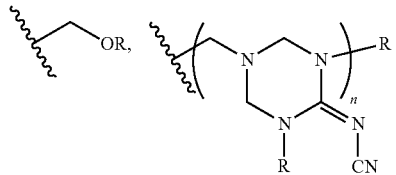

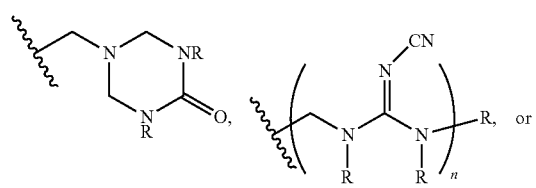

wherein each R is independently hydrogen, substituted or unsubstituted alkyl, or Y, wherein Y is represented by:

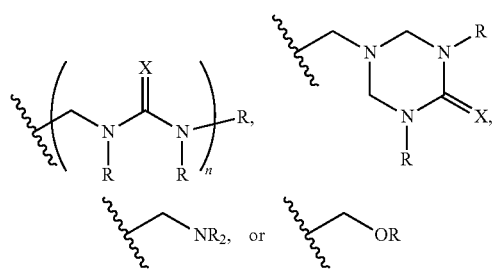

wherein X and R are defined above, and wherein n is an integer from 0 to 100, preferably 0, 1, 2, or 3.

In Formula (I), if X is O, one or more of $R_1$, $R_2$, $R_3$, or $R_4$ is

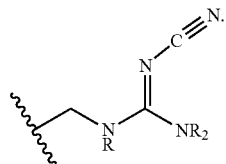

In some embodiments, the one or more reaction products is a compound of Formula (A), a compound of Formula (B), or a compound of Formula (C).

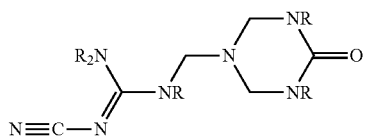

Formula (A)

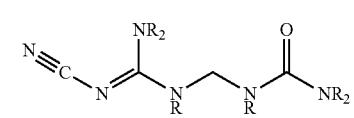

Formula (B)

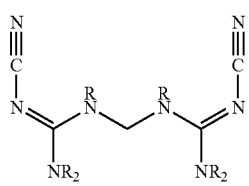

Formula (C)

In Formulas (A), (B), and (C), each R is independently hydrogen, substituted or unsubstituted alkyl, or Y, wherein Y is represented by:

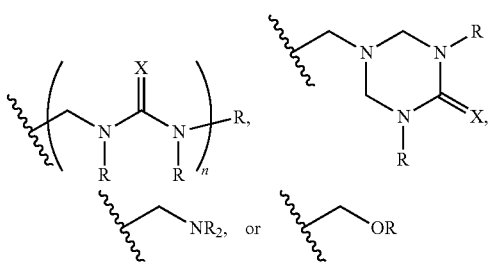
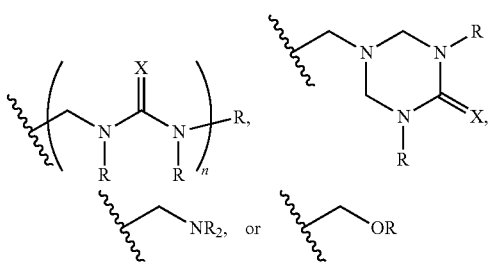

wherein X and R are defined above, and wherein n is an integer from 0 to 100, preferably 0, 1, 2, or 3.

In some embodiments, the agricultural composition further comprises water, and the water content ranges from 10 wt. % to 30 wt. % of the total agricultural composition.

In some embodiments, the viscosity of the agricultural composition is less than 150 cps, such as less than 100 cps.

In some embodiments, the agricultural composition further comprises a dye.

The present disclosure also includes fertilizer compositions, which comprise an agricultural composition, as disclosed herein, and a nitrogen source.

Processes for preparing an agricultural composition and fertilizer composition are also provided.

BRIEF DESCRIPTION OF THE DRAWINGS

FIG. 1 depicts a portion of a LC-MS chromatogram.

DETAILED DESCRIPTION OF THE PREFERRED EMBODIMENTS

Agricultural Compositions:

The present disclosure relates to agricultural compositions comprising one or more reaction products prepared from paraformaldehyde, a nitrification inhibitor, urea, an ammonia source, and optionally a solvent, wherein the one or more reaction products are present in an amount of at least 20 wt. % of the total weight of the agricultural composition. In some embodiments, the one or more reaction products is present in an amount of at least 27.5 wt. % of the total weight of the agricultural composition. In some embodiments, the one or more reaction products is present in an amount of at least 30 wt. % of the total weight of the agricultural composition.

The agricultural compositions of the present disclosure may also comprise paraformaldehyde, a nitrification inhibitor, urea, an ammonia source, optionally a solvent, or a combination thereof in their unreacted forms that are not part of the reaction product. As used herein, "paraformaldehyde" refers to compounds of formula $HO(CH_2O)_nH$ wherein n is greater than 3. Paraformaldehyde may be polydisperse and may include compounds of formula $HO(CH_2O)_nH$ having a different number of repeated units, i.e. compounds having different n. In some embodiments, the paraformaldehyde has an average n greater than 5. In some embodiments, the paraformaldehyde has an average n greater than 8. In some embodiments, the paraformaldehyde has an average n ranging from 8 to 100. In some embodiments, the paraformaldehyde is a solid. It was surprisingly found that use of paraformaldehyde to prepare the reaction products disclosed herein provides an agricultural composition having improved properties such as, e.g., a relatively higher concentration of the one or more soluble reaction products.

As used herein, "nitrification inhibitor" refers to compounds capable of inhibiting the bacterial oxidation of ammonium to nitrate in the soil. Nitrification inhibitors include, but are not limited to, 2-chloro-6-trichloromethyl-pyridine, 5-ethoxy-3-trichloromethyl-1,2,4-thiadiazol, dicyandiamide, 2-amino-4-chloro-6-methyl-pyrimidine, 1,3-benzothiazole-2-thiol, 4-amino-N-1,3-thiazol-2-ylbenzenesulfonamide, thiourea, guanidine, 3,4-dimethylpyrazole phosphate, 2,4-diamino-6-trichloromethyl-5-triazine, polyetherionophores, 4-amino-1,2,4-triazole, 3-mercapto-1,2,4-triazole, potassium azide, carbon bisulfide, sodium trithiocarbonate, ammonium dithiocarbamate, 2,3, dihydro-2,2-dimethyl-7-benzofuranol methyl-carbamate, N-(2,6-dimethylphenyl)-N-(methoxyacetyl)-alanine methyl ester, ammonium thiosulfate, 1-hydroxypyrazole, 2-methylpyrazole-1-carboxamide, 1,2,4-triazole, 3-methylpyrazole, derivatives thereof, and any combination thereof. In at least embodiment, the nitrification inhibitor is dicyandiamide (DCD).

The urea can be used in many forms. For example, the urea can be a solid in the form of prills, flakes, granules, and the like, and/or a solution, such as an aqueous solution. At least a portion of the urea can be in the form of animal waste. Any of these urea sources can be used alone or in any combination.

As used herein, the term "ammonia source" refers to ammonia and ammonium compounds that liberate ammonia when reacted with paraformaldehyde and the nitrification inhibitor. Ammonia sources include, for example, ammonium salts such as ammonium nitrate, aqueous ammonia or ammonium hydroxide, anhydrous ammonia, or combinations thereof. Suitable aqueous ammonium solutions may have an ammonia concentration of about 28 wt. %, about 30 wt. %, about 32 wt. %, or about 35 wt. %, for example. Other suitable ammonia sources include, for example, primary amines or substituted primary amines such as methyl amine, monomethanol amine, amino propanol, or any combination thereof. Difunctional amines such as ethylene diamine or any combination of organic amines provided that one primary amine group is available to form a triazone ring can be used. Another source of ammonia can be in the form of animal waste such as urine and/or manure. Any of these ammonia sources can be used alone or in any combination. The ammonia source may be used in any form such a liquid, solid, and/or gas.

The reaction products of the present disclosure may comprise discrete compounds, polydisperse compounds, and/or combinations thereof. For example, reaction products may comprise polydisperse oligomers and polymers. The reaction products may have a weight average molecular weight (or molar mass) of about 100 Da or greater. Molar mass of the reaction products may be about 100 Da to about 10,000 Da, about 100 Da to about 5,000 Da, about 100 Da to about 1,000 Da, or about 100 Da to about 500 Da. In some embodiments, the molar mass of the reaction products range from one or more of 100 Da to 200 Da; 200 Da to 300 Da; 300 Da to 400 Da; 500 Da to 1,000 Da, 1,000 Da to 2,000 Da; and 2,000 Da and greater.

The reaction products of the present disclosure may be analyzed by standard techniques such as high performance liquid chromatography (HPLC), liquid chromatography mass spectrometry (LCMS), size exclusion chromatography (SEC), and nuclear magnetic resonance (NMR) spectroscopy.

In some embodiments, reaction products have an oligomeric and/or polymeric backbone having nitrogen-carbon-nitrogen repeat units. In some embodiments, an oligomeric and/or polymeric backbone is one or more of linear, branching, cyclic, or combinations thereof. In some embodiments, the reaction products having an oligomeric and/or polymeric backbone have one or more pendant groups chosen from:

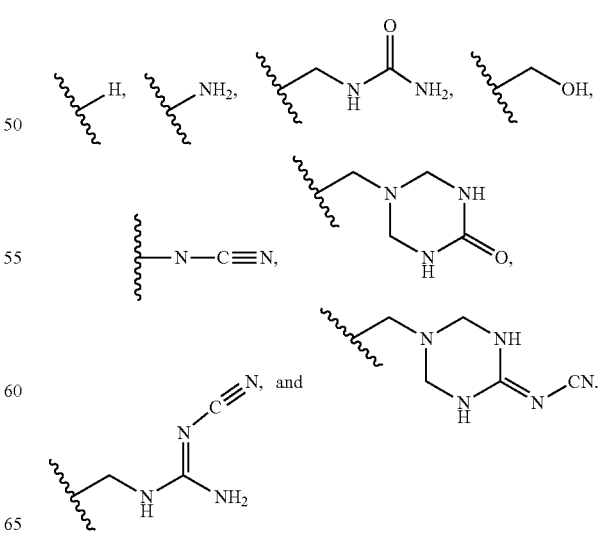

In some embodiments, the one or more reaction products are one or more compounds of Formula (I).

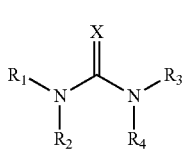

Formula (I)

In Formula (I), X is O or

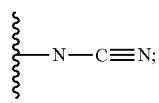

$R_1$, $R_2$, $R_3$, and $R_4$ are each independently:

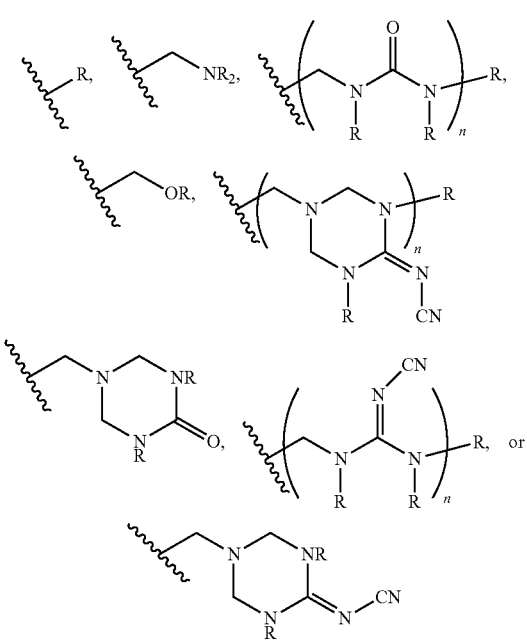

wherein each R is independently hydrogen, substituted or unsubstituted alkyl, or Y, wherein Y is represented by:

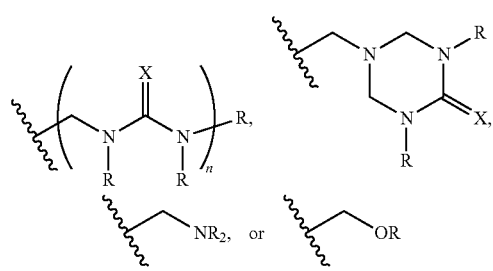

wherein X and R are defined above, and wherein n is an integer from 0 to 100, preferably 0, 1, 2, or 3.

In Formula (I), if X is O, one or more of $R_1$, $R_2$, $R_3$, or $R_4$ is

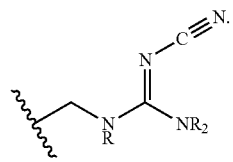

In some embodiments, the one or more reaction products is a compound of Formula (A), a compound of Formula (B), or a compound of Formula (C).

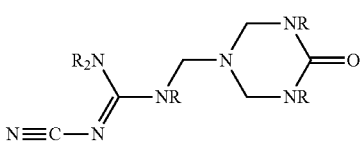 [SMILES: N#C/N=C(\N)NCN1CNC(=O)NC1]

Formula (A)

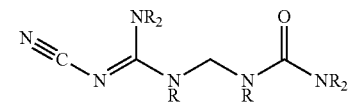

Formula (B)

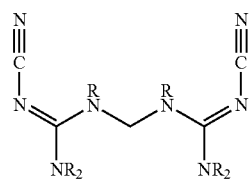

Formula (C)

In Formulas (A), (B), and (C), each R is independently hydrogen, substituted or unsubstituted alkyl, or Y, wherein Y is represented by:

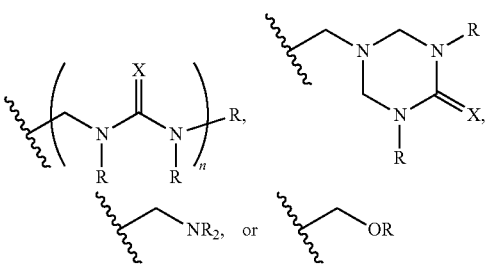

wherein X and R are defined above, and wherein n is an integer from 0 to 100, preferably 0, 1, 2, or 3.

In some embodiments, the agricultural composition further comprises water, and the water content ranges from 10 wt. % to 30 wt. % of the total agricultural composition. The water content of the agricultural compositions of the present disclosure may be lowered by distillation while maintaining good stability of the resulting composition. In at least one embodiment, distillation may be used to remove at least 3 wt. % of water, at least 4 wt. % of water, at least 5 wt. % of water, at least 6 wt. % of water from the agricultural composition. In other embodiments, distillation may be used to remove at least 10 wt. % of water. In at least one embodiment, following distillation, the resulting agricultural composition maintains the same stability profile as it possessed before water was removed.

The viscosity of the agricultural compositions disclosed herein may vary. In some embodiments, the viscosity is less than 150 cps at 25° C. In some embodiments, the viscosity of the agricultural composition is less than 100 cps at 25° C. In some embodiments, the viscosity of the agricultural composition is less than 90 cps at 25° C. In some embodiments, the viscosity of the agricultural composition is less than 80 cps at 25° C. In some embodiments, the viscosity of the agricultural composition is less than 70 cps at 25° C. In some embodiments, the viscosity of the agricultural composition ranges from 10 cps to 150 cps at 25° C. In some embodiments, the viscosity of the agricultural composition ranges from 25 cps to 150 cps at 25° C. In some embodiments, the viscosity of the agricultural composition ranges from 50 cps to 150 cps at 25° C. In some embodiments, the viscosity of the agricultural composition ranges from 50 cps to 100 cps at 25° C. In some embodiments, additional water can be removed. In such embodiments, the viscosity ranges from 150 cps to 8000 cps at 25° C., such as from 15 to 1500 cps at 25° C. In some embodiments, the viscosity ranges from 150 cps to 1000 cps at 25° C. In some embodiments, the viscosity ranges from 150 cps to 500 cps at 25° C. In some embodiments, the viscosity ranges from 150 cps to 400 cps at 25° C. In some embodiments, the viscosity ranges from 150 cps to 300 cps at 25° C. In some embodiments, the viscosity ranges from 150 cps to 250 cps at 25° C.

In some embodiments, the agricultural composition has a pH ranging from 7 to 14, such as a pH ranging from 8 to 10 or from 8 to 11.

In some embodiments, the agricultural composition further comprises a dye. Exemplary dyes include FD&C Blue No. 1, FD&C Red No. 33, FD&C Blue No. 1, FD&C Green No. 3, FD&C Yellow No. 5, FD&C Red No. 3, FD&C Red No. 40, FD&C Yellow No. 6, and AGROTAIN® ULTRA green dye.

The agricultural compositions of the present disclosure may comprise a total amount of paraformaldehyde, a nitrification inhibitor, urea, an ammonia source, and one or more reaction products thereof ranging from 30 wt. % to 95 wt. % by total weight of the agricultural composition. In some embodiments, the agricultural composition comprises a total amount of paraformaldehyde, a nitrification inhibitor, urea, an ammonia source, and one or more reaction products thereof ranging from 65 wt. % to 85 wt. % by total weight of the agricultural composition.

The agricultural compositions of the present disclosure may also include a solvent or solvents. Suitable solvents include but are not limited to water, an alcohol, an alcohol derivative, a glycol, a glycol derivative, primary and simple amines, aromatic hydrocarbons, a polar aprotic organic solvent, a polar protic solvent, and ammonia. In some embodiments, the alcohol may be methanol, ethanol, isopropanol, ethylene glycol, propylene glycol, benzyl alcohol, or a combination thereof. In some embodiments, the alcohol derivative may be isopropylidine glycerol. Other examples of glycols include, but are not limited to, polyethylene glycols (PEG), diethylene glycol, dipropylene glycol, 1,4-butanediol, 1,5-pentanediol, 1,6-hexanediol, 1,10-decanediol, 1,7-heptanediol, 1,9-nonanediol, 1,8-octanediol, 1,3-propanediol, 1,3-butanediol, 1,4-butanediol, 2,3-butanediol, 2,4-pentanediol, 2,5-hexanediol, 4,5-octanediol, and 3,4-hexanediol or combinations thereof. Other examples of glycol derivatives include, but are not limited to ethylene glycol methyl ether acetate, ethylene glycol monoethyl ether acetate, ethylene glycol monobutyl ether acetate, propylene glycol methyl ether acetate, ethylene glycol monostearate, ethylene glycol distearate, ethylene glycol amido stearate, propylene glycol monostearate, propylene glycol dicaprylate, propylene glycol dicaprate diacetate glycol, dilaurate glycol, dipalmite glycol, diformate glycol, dibutyrate glycol, dibenzorate glycol, dipalmate glycol, dipropionate glycol, monoacetate glycol, monopalmitate glycol, monoformate glycol, and diethylene glycol monostearate. Examples of glycol derivatives also include, but are not limited to, $C_3$-$C_{12}$ triols and/or $C_3$-$C_{12}$ triol derivatives, including $C_3$-$C_6$ triols, glycerol monostearate, glycerol distearate, glycerol monooleate, glycerol monolaurate, glycerol dilaurate, glycerol dipalmitate, glycerol monopalmitate, glycerol triacetate, glycerol tribenzoate, glycerol tributyrate, glycerol trimyristate, glycerol trioleate, glycerol trilaurate, glycerol tripalmitate, and glycerol tristearate. In at least one embodiment, the alcohol is propylene glycol. In some embodiments, the solvent includes water, such that the agricultural composition is an aqueous solution. In some embodiments, the aprotic organic solvent is chosen from N-methyl pyrrolidinone (NMP), glycol ethers, which can be either protic or aprotic, DMSO, dibasic esters, lactones, lactams, and combinations thereof. In some embodiments, the glycol ethers may be diethylene glycol monoethyl ether, diethylene glycol monopropyl ether, diethylene glycol monopentyl ether, diethylene glycol monoisopropyl ether, diethylene glycol monoisobutyl ether, diethylene glycol monohexyl ether, triethylene glycol monomethyl ether, triethylene glycol monopropyl ether, triethylene glycol monobutyl ether, triethylene glycol monopentyl ether, triethylene glycol monoisopropyl ether, triethylene glycol monoisobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, tetraethylene glycol monopentyl ether, tetraethylene glycol monoisopropyl ether, tetraethylene glycol monoisobutyl ether, tetraethylene glycol monohexyl ether, dipropylene glycol monoethyl ether, dipropylene glycol monopropyl ether, dipropylene glycol monobutyl ether, dipropylene glycol monopentyl ether, dipropylene glycol monoisopropyl ether, dipropylene glycol monoisobutyl ether, dipropylene glycol monohexyl ether, tripropylene glycol monoethyl ether, tripropylene glycol monopropyl ether, tripropylene glycol monobutyl ether, tripropylene glycol monopentyl ether, tripropylene glycol monoisopropyl ether, tripropylene glycol monoisobutyl ether, tripropylene glycol monohexyl ether, or combinations thereof. In some embodiments, the agricultural compositions does not comprise an aprotic organic solvent. In some embodiments, the agricultural compositions does not contain a polar aprotic solvent, such as DMSO. In at least one embodiment, the solvent is incorporated into the reaction product or products with paraformaldehyde, a nitrification inhibitor, urea, and an ammonia source. In such an embodiment, the agricultural composition may also contain the same or a different solvent in unreacted form.

The agricultural compositions of the present disclosure may include additives suitable for use in agricultural settings, including by way of example, pesticides, herbicides, and fungicides.

In some embodiments, an agricultural composition is a composition prepared by any of the processes for preparing an agricultural composition disclosed herein.

Processes for Preparing an Agricultural Composition:

The present disclosure also provides processes for preparing an agricultural composition according to the present disclosure.

Agricultural compositions according to the present disclosure may be prepared by reacting paraformaldehyde, a nitrification inhibitor, urea, an ammonia source, optionally a solvent to obtain one or more reaction products, wherein the resulting agricultural composition comprises at least 20 wt. % of the one or more reaction products based on the total weight of the agricultural composition. Specifically, the presently disclosed agricultural compositions may contain 20 wt. % of one reaction product of paraformaldehyde, a nitrification inhibitor, urea, an ammonia, source and optionally a solvent, based on the total weight of the agricultural composition. Alternatively, the agricultural composition may contain at least 20 wt. % of a combination of multiple reaction products, such as two or more, prepared from paraformaldehyde, a nitrification inhibitor, urea, an ammonia, source and optionally a solvent.

In some embodiments, a process for preparing an agricultural composition comprises reacting paraformaldehyde, a nitrification inhibitor, urea, an ammonia source, and optionally a solvent to obtain one or more reaction products. In at least one embodiment, the agricultural composition comprises a total amount of paraformaldehyde, a nitrification inhibitor, urea, an ammonia source, and one or more reaction products ranging from 30 wt. % to 95 wt. % by total weight of the agricultural composition. In some embodiments, a process for preparing an agricultural composition comprises reacting paraformaldehyde, a nitrification inhibitor, urea, an ammonia source, and optionally a solvent to obtain one or more reaction products, wherein the agricultural composition comprises a total amount of paraformaldehyde, a nitrification inhibitor, urea, an ammonia source, and one or more reaction products ranging from 65 wt. % to 85 wt. % by total weight of the agricultural composition.

In some embodiments, the reaction or reactions of paraformaldehyde, a nitrification inhibitor, urea, an ammonia source, and optionally a solvent to obtain one or more reaction products are caried out at a pH greater than 7, such as at a pH ranging from 7 to 10.

In at least one embodiment, a process for preparing an agricultural composition according to the present disclosure comprises forming a first mixture comprising paraformaldehyde, an optional solvent, a first amount of an ammonia source, a nitrification inhibitor, and a first amount of urea; heating the first mixture to a first temperature ranging from 65° C. to 85° C. for a first reaction time; adding to the first mixture an optional second amount of an ammonia source and a second amount of urea to form a second mixture; and heating the second mixture to a second temperature ranging from 65° C. to 85° C. for a second reaction time.

The process for preparing an agricultural composition according to the present disclosure may further include a cooling step. Additional agents, such as for example, solvents, dyes, or other additives may also be added before or after cooling.

The first reaction time may, for example, range from 10 minutes to 3 hours. The second reaction time may, for example, range from 10 minutes to 5 hours.

In some embodiments, the first amount of an ammonia source is less than the second amount of an ammonia source. In some embodiments, the first amount of an ammonia source is from 10% to 50% of the second amount of an ammonia source. In other embodiments, there is only one ammonia addition.

In some embodiments, the first amount of the urea is less than the second amount of the urea. In some embodiments, the first amount of the urea is from 10% to 50% of the second amount of the urea.

The process to prepare the agricultural compositions disclosed herein may include the addition of solvents. In some embodiments, the solvent is water, an alcohol, primary or simple amines, aromatic hydrocarbons, ammonia, or a combination thereof. In some embodiments, the alcohol is methanol, ethanol, isopropanol, ethylene glycol, propylene glycol, or a combination thereof. In at least one embodiment, the alcohol is propylene glycol. In some embodiments, the solvent includes water, such that the agricultural composition is an aqueous solution. In some embodiments, the aprotic organic solvent is chosen from N-methyl pyrrolidinone (NMP), glycol ethers, which can be protic or aprotic, DMSO, dibasic esters, and combinations thereof. In some embodiments, the process to prepare the agricultural compositions does not comprise an aprotic organic solvent. In some embodiments, the process to prepare the agricultural compositions does not contain a polar aprotic solvent, such as DMSO. In at least one embodiment, the solvent is incorporated into the reaction product or products with paraformaldehyde, a nitrification inhibitor, urea, and an ammonia source. In such an embodiment, the agricultural composition may also contain the same or a different solvent in unreacted form. The solvent may be added at any point, including before, during or after, the first and/or second reaction times.

In some embodiments, the nitrification inhibitor is dicyandiamide.

In some embodiments, a weight ratio of the paraformaldehyde to the urea ranges from 1:5 to 5:1. In at least one embodiment, the weight ratio of the paraformaldehyde to urea ranges from 1:1 to 2:1, such as from 1:1.2 to 2:1. In at least one embodiment, the weight ratio of the paraformaldehyde to urea is about 1.4. In another embodiment, the weight ratio of the paraformaldehyde to urea is about 2. In another embodiment, the weight ratio of the paraformaldehyde to urea is about 3.

In some embodiments, a weight ratio of the paraformaldehyde to the ammonia source ranges from 1:1 to 20:1. In at least one embodiment, the weight ratio of the paraformaldehyde to ammonia ranges from 1:1 to 5:1, such as from 1:1.2 to 4:1. In at least one embodiment, the weight ratio of the paraformaldehyde to ammonia is about 4:1.

In some embodiments, a weight ratio of paraformaldehyde to the nitrification inhibitor ranges from 1:5 to 5:1. In at least one embodiment, the weight ratio of the paraformaldehyde to nitrification inhibitor ranges from 1:1 to 2.5:1, such as from 1:1.2 to 2:1. In at least one embodiment, the weight ratio of the paraformaldehyde to nitrification inhibitor is about 1.6. In another embodiment, the weight ratio of the paraformaldehyde to nitrification inhibitor is about 2.

In some embodiments, the one or more reaction products prepared according to the process disclosed herein is a compound of Formula (I).

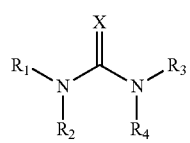

Formula (I)

In Formula (I), X is O or

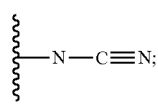

$R_1$, $R_2$, $R_3$, and $R_4$ are each independently:

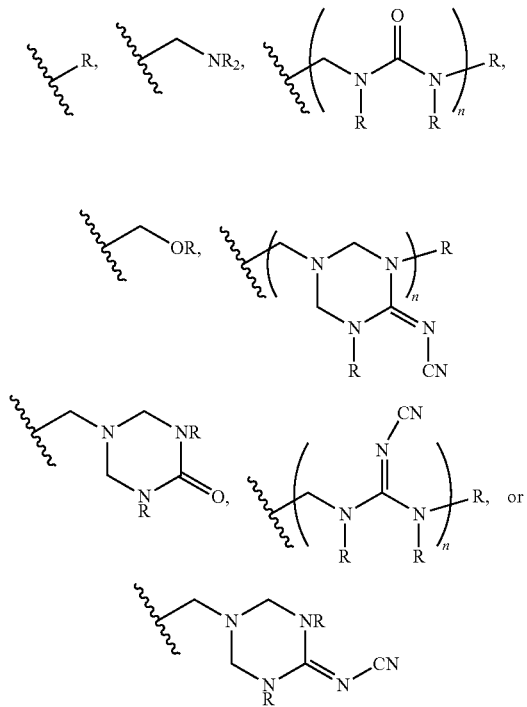

wherein each R is independently hydrogen, substituted or unsubstituted alkyl, or Y, wherein Y is represented by:

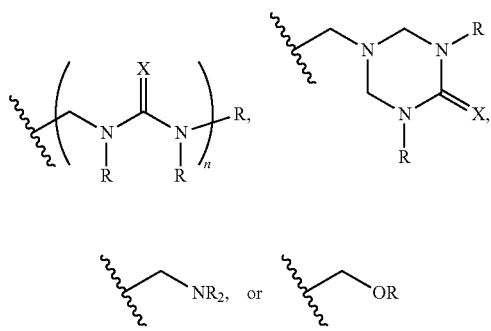

wherein X and R are defined above, and wherein n is an integer from 0 to 100, preferably 0, 1, 2, or 3.

In Formula (I), if X is O, one or more of $R_1$, $R_2$, $R_3$, or $R_4$ is

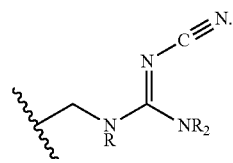

In some embodiments, the one or more reaction products is a compound of Formula (A), a compound of Formula (B), or a compound of Formula (C).

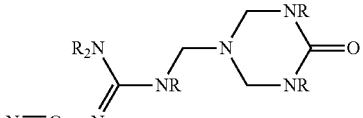
Formula (A)

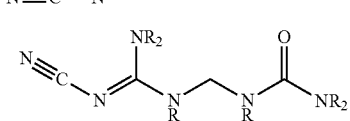
Formula (B)

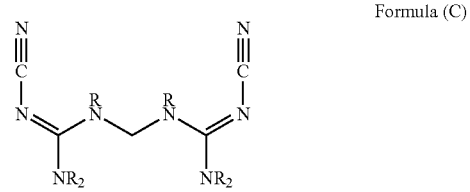
Formula (C)

In Formulas (A), (B), and (C), each R is independently hydrogen, substituted or unsubstituted alkyl, or Y, wherein Y is represented by:

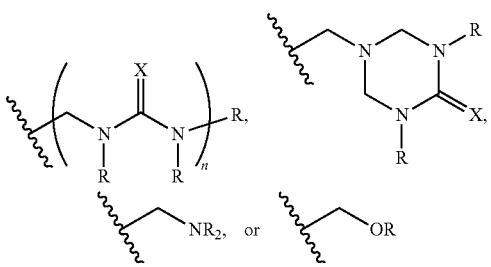

wherein X and R are defined above, and wherein n is an integer from 0 to 100, preferably 0, 1, 2, or 3.

Fertilizer Compositions:

The present disclosure also includes fertilizer compositions comprising an agricultural composition as disclosed herein and a nitrogen source. Suitable nitrogen sources included, but are not limited to, urea, ammonium nitrate, anhydrous ammonia, aqueous ammonia, urea-formaldehyde polymers, or any combination thereof. The nitrogen source can be a solid, liquid gas, or any combination thereof. In at least one embodiment, the nitrogen source may be molten urea. Another suitable nitrogen source can be or include the waste, such as urine or manure, from one or more animals, e.g., cows, sheep, chickens, buffalo, turkeys, goats, pigs, horses, and the like. In some embodiments, the fertilizer composition comprises an agricultural composition, urea, and ammonium nitrate.

In some embodiments, the fertilizer composition is formed by blending an agricultural composition with a composition comprising urea. In some embodiments, the composition comprising urea is urea ammonium nitrate (UAN), urea-formaldehyde polymer (UFP), or a combination thereof. In some embodiments, the fertilizer composition is formed by blending an agricultural composition with a composition comprising urea at a rate of from 1 to 8 quarts of the agriculture composition per ton of the composition comprising urea. In some embodiments, the fertilizer composition is formed by blending an agricultural composition with a composition comprising urea at a rate of from 2 to 4 quarts of the agriculture composition per ton of the composition comprising urea. In some embodiments, the fertilizer composition is formed by blending an agricultural composition with a composition comprising urea at a rate of 2 quarts, 3 quarts, or 4 quarts of the agriculture composition per ton of the composition comprising urea.

In some embodiments, the fertilizer composition is a liquid. In some embodiments, the viscosity of the fertilizer composition is less than 150 cps. In some embodiments, the viscosity of the fertilizer composition is less than 100 cps. In some embodiments, the viscosity of the fertilizer composition is less than 90 cps. In some embodiments, the viscosity of the fertilizer composition is less than 80 cps. In some embodiments, the viscosity of the fertilizer composition is less than 70 cps. In some embodiments, the viscosity of the fertilizer composition ranges from 10 cps to 150 cps. In some embodiments, the viscosity of the fertilizer composition ranges from 25 cps to 150 cps. In some embodiments, the viscosity of the fertilizer composition ranges from 50 cps to 150 cps. In some embodiments, the viscosity of the fertilizer composition ranges from 50 cps to 100 cps.

In some embodiments, the fertilizer composition is a solid, such as for example coated urea. In some embodiments, the fertilizer composition is a solid and the solid has a crush strength equal to or better than that of uncoated urea. In some embodiments, the fertilizer composition is a solid and the solid has a crush strength equal to that of uncoated urea ±50%. In some embodiments, the fertilizer composition is a solid and the solid has a crush strength equal to that of uncoated urea ±25%. In some embodiments, the fertilizer composition is a solid and the solid is non-caking.

In some embodiments, the fertilizer composition further comprises a urease inhibitor. As used herein, the term "urease inhibitor" refers to any compounds that reduces, inhibits, or otherwise slows down the conversion of urea to ammonium ($NH_4^+$) in soil. Urease inhibitors can include, for example, N-(n-butyl)thiophosphoric triamide, N-(n-butyl) phosphoric triamide, thiophosphoryl triamide, phenyl phosphorodiamidate, cyclohexyl phosphoric triamide, cyclohexyl thiophosphoric triamide, phosphoric triamide, hydroquinone, p-benzoquinone, hexamidocyclotriphosphazene, thiopyridines, thiopyrimidines, thiopyridine-N-oxides, N,N-dihalo-2-imidazolidinone, N-halo-2-oxazolidinone, 2-nitrophenylphosphoric triamide, derivatives thereof, or any combination thereof. In some embodiments, the urease inhibitor comprises N-(n-butyl)thiophosphoric triamide (NBPT). In some embodiments, the urease inhibitor comprises one or more reaction products of formaldehyde, urea, and N-(n-butyl)thiophosphoric triamide (NBPT).

In some embodiments, the nitrogen source can be mixed with the agricultural composition in the soil, on or about the surface of the soil, or a combination thereof. For example, the nitrogen source comprises animal waste such as urine and/or manure deposited on and/or in the soil. In another example, the nitrogen source comprises a fertilizer product previously applied to the soil. As such, the agricultural composition can be applied to the soil and mixed with the animal waste and/or previously applied fertilizer(s) on the surface of and/or within the soil. The agricultural composition can be applied to the soil before, during, and/or after the animal waste and/or fertilizer(s) are deposited on/in the soil. In some embodiments, the nitrogen source comprises animal waste such as urine and/or manure that can be collected and placed within a holding tank, pond, or the like, and the agricultural composition can be added to the animal waste to provide a fertilizer composition.

If the nitrogen source comprises animal waste such as urine and/or manure, the amount of the agricultural composition combined with the nitrogen source comprising animal waste ranges from about 0.1 wt. % to about 25 wt. %, based on the total amount of nitrogen in the one or more nitrogen sources. In some embodiments, the amount of agricultural composition combined with the nitrogen source comprising animal waste ranges from about 0.5 wt. %, about 1 wt. %, about 2 wt. %, about 3 wt. %, about 4 wt. %, or about 5 wt. % to about 10 wt. %, about 12 wt. %, about 15 wt. %, about 18 wt. %, about 20 wt. %, or about 25 wt. %, based on the total amount of nitrogen in the one or more nitrogen sources in the fertilizer. In some embodiments, the amount of agricultural composition combined with the nitrogen source comprising animal waste can range from about 0.5 wt. % to about 3 wt. %, about 5 wt. % to about 15 wt. %, about 8 wt. % to about 12 wt. %, or about 10 wt. % to about 20 wt. %, based on the total amount of nitrogen in the one or more nitrogen sources in the fertilizer. In some embodiments, the nitrogen source comprising animal waste further comprises one or more additional nitrogen sources chosen from urea, ammonia, ammonium nitrate, and any combination thereof. For example, the agricultural composition can be applied to a soil that contains a fertilizer containing urea, ammonia, ammonium nitrate, animal waste(s), or any combination thereof.

In some embodiments, the agricultural composition is combined with one or more quick release nitrogen sources and/or one or more controlled release nitrogen sources to provide the fertilizer. As used herein, the term "quick release nitrogen" refers to free urea, ammonium nitrate, anhydrous ammonia, aqueous ammonia, or any combination thereof. As used herein, the term "controlled release nitrogen" refers to a substituted urea, reacted urea, e.g., urea-formaldehyde polymer, or a combination thereof. For example, a fertilizer composition comprises a combination of the agricultural composition, a urea-formaldehyde polymer (UFP), and an aqueous solution of urea (U), an aqueous solution of ammonium nitrate (AN), an aqueous solution of urea-ammonium nitrate (UAN), or any combination thereof. For example, the fertilizer composition containing both quick release and controlled release nitrogen sources can include the controlled release nitrogen source(s) in an amount ranging from a low of about 10 wt. %, about 20 wt. %, about 30 wt. %, or about 40 wt. % to a high of about 60 wt. %, about 70 wt. %, about 80 wt. %, about 90 wt. %, or about 95 wt. %, based on the total weight of nitrogen in both the controlled release nitrogen source and the quick release nitrogen source. The fertilizer composition containing both quick release and controlled release nitrogen sources can have a concentration of the reaction product ranging from about 0.5 wt. % to about 25 wt. %, about 1 wt. % to about 15 wt. %, about 5 wt. % to about 20 wt. %, or about 1 wt. % to about 20 wt. %, based on the total nitrogen in the quick release nitrogen source(s). In some embodiments, the fertilizer composition comprises aqueous urea-formaldehyde solution (UF) mixed with a quick release nitrogen source at a weight ratio from about 90:10 to about 10:90, about 80:20 to about 20:80, about 75:25 to about 25:75, or about 30:70 to about 70:30 and the reaction product can be present in an amount ranging from about 1 wt. % to about 20 wt. % based on the total amount of nitrogen in the quick release nitrogen source.

In some embodiments, the fertilizer composition further comprises one or more fertilizer nutrient additives. Illustrative fertilizer nutrient additives can include, for example, phosphorous and/or potassium-based nutrients. A commercially available fertilizer nutrient can include, for example, K-Fol 0-40-53, which is a solution that contains 40 wt. % phosphate and 53 wt. % potassium, which is manufactured and distributed by GBS Biosciences, LLC.

In some embodiments, the fertilizer composition further comprises one or more pesticides, herbicides, fungicides, or any combination thereof.

Depending on the particular composition of the fertilizer composition comprising the agricultural composition and one or more nitrogen sources, application rates to soil can widely vary. For example, a fertilizer composition having a concentration of the one or more reaction products ranging from about 0.5 wt. % to about 25 wt. %, based on the total amount of nitrogen in the one or more nitrogen sources, can be applied to a soil in an amount ranging from about 5 kg/hectare (kg/ha), about 10 kg/ha, about 20 kg/ha, about 30 kg/ha, about 40 kg/ha, or about 50 kg/ha to about 100 kg/ha, about 150 kg/ha, about 200 kg/ha, about 250 kg/ha, about 300 kg/ha, about 350 kg/ha, or about 400 kg/ha. In some embodiments, the agricultural composition can be applied to a soil in an amount ranging from about 1 kg/ha, about 3 kg/ha, about 5 kg/ha, about 7 kg/ha, or about 10 kg/ha to a high of about 30 kg/ha, about 35 kg/ha, about 40 kg/ha, about 45 kg/ha, about 50 kg/ha, about 60 kg/ha, about 70 kg/ha, or about 80 kg/ha. The particular amount of the reaction product, when applied alone to the soil, can be based, at least in part, on the amount of nitrogen within and/or on the soil and/or the amount of nitrogen expected to be deposited on and/or within the soil.

Additional Nonlimiting Exemplary Embodiments Include:

1. An agricultural composition comprising: paraformaldehyde, a nitrification inhibitor, urea, an ammonia source, or a combination thereof and one or more reaction products prepared from paraformaldehyde, a nitrification inhibitor, urea, and an ammonia source, wherein the one or more reaction products is present in an amount of at least 20 wt. % of the total weight of the agricultural composition.

2. The agricultural composition according to embodiment 1, wherein the nitrification inhibitor is dicyandiamide.

3. The agricultural composition according to embodiment 1, wherein the one or more reaction products is a compound of Formula (I):

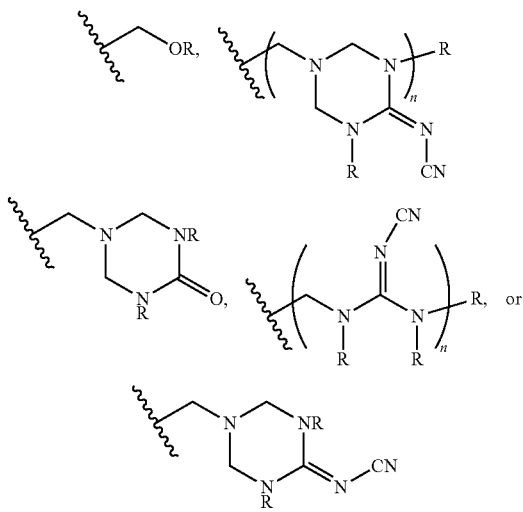

Formula (I)

wherein X is O or

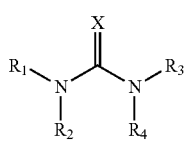

$R_1$, $R_2$, $R_3$, and $R_4$ are each independently:

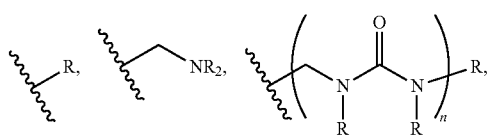

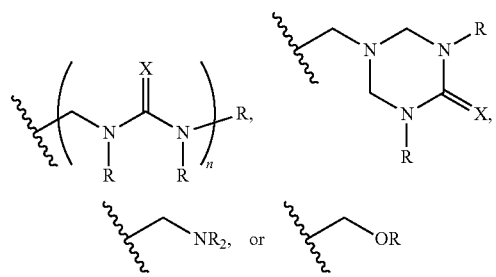

wherein each R is independently hydrogen, substituted or unsubstituted alkyl, or Y, and wherein Y is represented by:

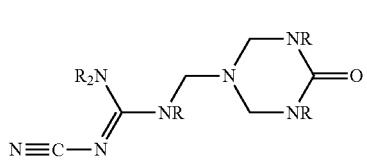

wherein X is O or

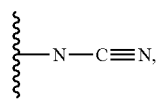

and wherein n is an integer from 0 to 100.

4. The agricultural composition according to embodiment 1, wherein the one or more reaction products is a compound of Formula (A), a compound of Formula (B), or a compound of Formula (C):

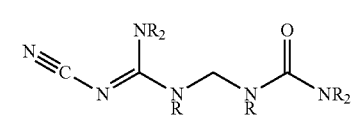

Formula (A)

Formula (B)

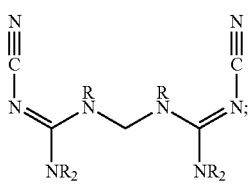

Formula (C)

wherein each R is independently hydrogen, substituted or unsubstituted alkyl, or Y, and wherein Y is represented by:

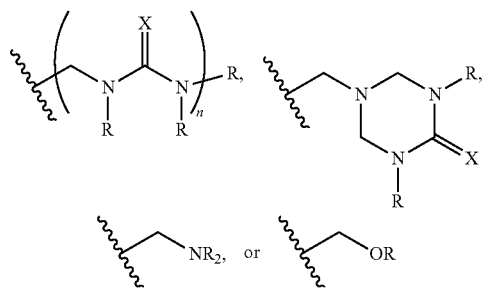

wherein X is O or

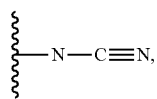

and wherein n is an integer from 0 to 100, preferably 0, 1, 2, or 3.

5. The agricultural composition according to embodiment 1, further comprising water, wherein the water content ranges from 10 wt. % to 30 wt. % of the total agricultural composition.

6. The agricultural composition according to embodiment 1, wherein the viscosity ranges from 15 cps to 1500 cps cps.

7. The agricultural composition according to embodiment 1, further comprising a dye.

8. The agricultural composition according to embodiment 1, further comprising an organic solvent.

9. The agricultural composition according to embodiment 8, wherein the organic solvent comprises an alcohol.

10. The agricultural composition according to embodiment 9, wherein the alcohol is a glycol.

11. The agricultural composition according to embodiment 10, wherein the glycol is propylene glycol.

12. A fertilizer composition comprising an agricultural composition according to embodiment 1 and a nitrogen source.

13. A process for preparing an agricultural composition comprising:
reacting paraformaldehyde, a nitrification inhibitor, urea, an ammonia source, and optionally a solvent, to obtain one or more reaction products, wherein the resulting agricultural composition comprises at least 20 wt. % of the one or more reaction products based on the total weight of the agricultural composition.

14. A process for preparing an agricultural composition comprising: forming a first mixture comprising paraformaldehyde, a first amount of an ammonia source, a nitrification inhibitor, and a first amount of urea; heating the first mixture to a first temperature ranging from 65° C. to 85° C. for a first reaction time; adding to the first mixture a second amount of urea and, optionally second amount of an ammonia source, to form a second mixture; and heating the second mixture to a second temperature ranging from 65° C. to 85° C. for a second reaction time.

15. The process according to embodiment 14, wherein the first reaction time ranges from 10 minutes to 3 hours.

16. The process according to embodiment 14, wherein the second reaction time ranges from 10 minutes to 10 hours.

17. The process according to embodiment 14, wherein the second amount of ammonia source is added and the first amount of ammonia source is less than the second amount of ammonia source.

18. The process according to embodiment 14, wherein the second amount of ammonia source is added and the first amount of ammonia source is from 10% to 50% of the second amount of ammonia source.

19. The process according to embodiment 14, wherein the second amount of ammonia source is added and the first amount of the urea is less than the second amount of the urea.

20. The process according to embodiment 14, wherein the second amount of ammonia source is added and the first amount of the urea is from 10% to 50% of the second amount of the urea.

21. The process according to embodiment 14, wherein the paraformaldehyde is dissolved in a solvent.

22. The process of embodiment 21, wherein the solvent is water, an alcohol, ammonia, an aprotic organic solvent, or a combination thereof.

23. The process according to embodiment 22, wherein the solvent is propylene glycol.

24. The process according to any one of embodiments 13 to 23, wherein the nitrification inhibitor is dicyandiamide.

25. The process according to embodiment 14, wherein a weight ratio of the paraformaldehyde to the urea ranges from 1:5 to 5:1.

26. The process according to embodiment 14, wherein a weight ratio of the paraformaldehyde to the ammonia source ranges from 1:1 to 20:1.

27. The process according to embodiment 14, wherein a weight ratio of paraformaldehyde to the nitrification inhibitor ranges from 1:5 to 5:1.

28. The process according to embodiment 14, wherein the one or more reaction products is a compound of Formula (I):

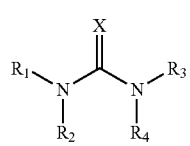

Formula (I)

wherein X is O or

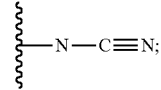

$R_1$, $R_2$, $R_3$, and $R_4$ are each independently:

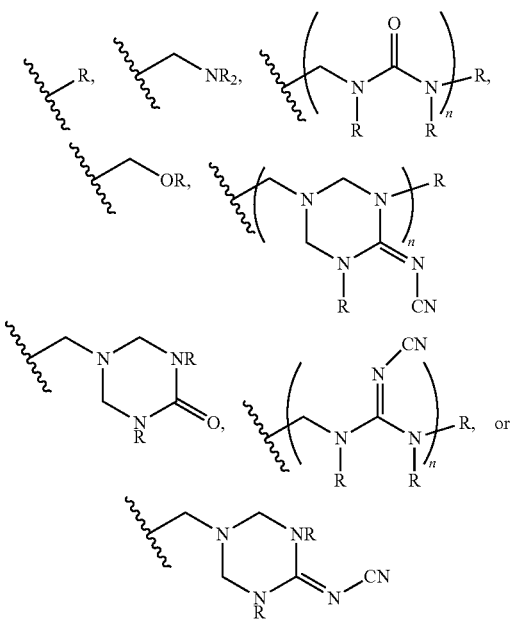

wherein each R is independently hydrogen, substituted or unsubstituted alkyl, or Y, wherein Y is represented by:

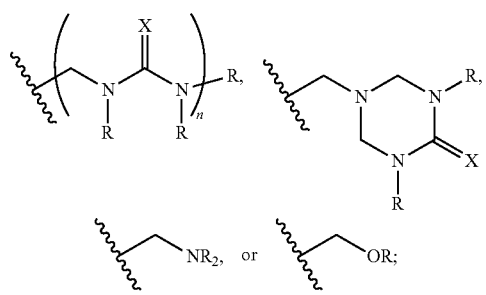

wherein X is O or

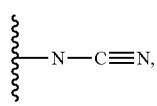

and wherein n is an integer from 0 to 100, preferably 0, 1, 2, or 3;

and wherein, if X is O, one or more of $R_1$, $R_2$, $R_3$, and $R_4$ is

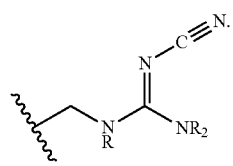

29. The process according to embodiment 14, wherein the one or more reaction products is a compound of Formula (A), a compound of Formula (B), or a compound of Formula (C):

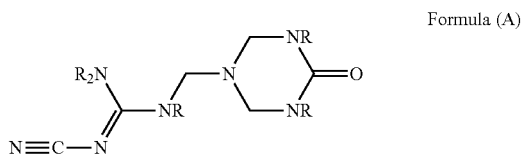

Formula (A)

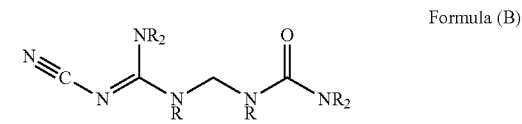

Formula (B)

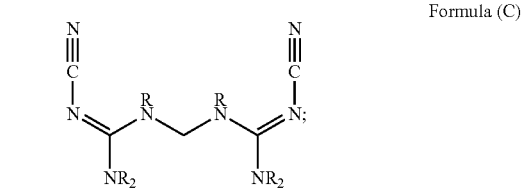

Formula (C)

wherein each R is independently hydrogen, substituted or unsubstituted alkyl, or Y, wherein Y is represented by:

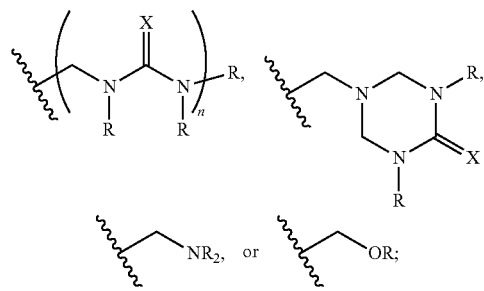

wherein X is O or

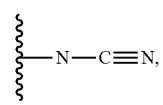

and wherein n is an integer from 0 to 100, preferably 0, 1, 2, or 3.

30. The process according to embodiment 14, wherein a weight ratio of the nitrification inhibitor to total urea ranges from 30:1 to 50:1.

31. The process according to embodiment 14, wherein the second amount of ammonia source is added.

32. The process according to embodiment 14, further comprising adding a third amount of urea.

33. The agricultural composition according to embodiment 1, wherein the viscosity is less than 100 cps.

34. The agricultural composition according to embodiment 1 or the process according to embodiment 14, wherein the agricultural composition has one or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

35. The agricultural composition according to embodiment 1 or the process according to embodiment 14, wherein the agricultural composition has two or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

36. The agricultural composition according to embodiment 1 or the process according to embodiment 14, wherein the agricultural composition has three or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

37. The agricultural composition according to embodiment 1 or the process according to embodiment 14, wherein the agricultural composition has four or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

38. The agricultural composition according to embodiment 1 or the process according to embodiment 14, wherein the agricultural composition has five or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

39. The agricultural composition according to embodiment 1 or the process according to embodiment 14, wherein the agricultural composition has six or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

40. The agricultural composition according to embodiment 1 or the process according to embodiment 14, wherein the agricultural composition has seven or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

41. The agricultural composition according to embodiment 1 or the process according to embodiment 14, wherein the agricultural composition has eight or more properties chosen from: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

42. The agricultural composition according to embodiment 1 or the process according to embodiment 14, wherein the agricultural composition has: an amount of the one or more reaction products ranging from 20 wt. % to 60 wt. % of the total weight of the agricultural composition, an amount of reaction products of urea, ammonia, and formaldehyde ranging from 4 wt. % to 20 wt. %, an amount of dicyandiamide ranging from 5 wt. % to 20 wt. %, an amount of water ranging from 5 wt. % to 40 wt. %, an amount of propylene glycol ranging from 0 wt. % to 30 wt. %, an amount of dye ranging from 0 wt. % to 6 wt. %, a viscosity ranging from 15 cps to 1500 cps, a pH ranging from 8 to 11, and a density ranging from 9.5 lb/gal to 11.5 lb/gal.

43. The agricultural composition according to embodiment 1 or the process according to embodiment 14, wherein the agricultural composition has one or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

44. The agricultural composition according to embodiment 1 or the process according to embodiment 14, wherein the agricultural composition has two or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

45. The agricultural composition according to embodiment 1 or the process according to embodiment 14, wherein the agricultural composition has three or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

46. The agricultural composition according to embodiment 1 or the process according to embodiment 14, wherein the agricultural composition has four or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

47. The agricultural composition according to embodiment 1 or the process according to embodiment 14, wherein the agricultural composition has five or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

48. The agricultural composition according to embodiment 1 or the process according to embodiment 14, wherein the agricultural composition has six or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

49. The agricultural composition according to embodiment 1 or the process according to embodiment 14, wherein the agricultural composition has seven or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

50. The agricultural composition according to embodiment 1 or the process according to embodiment 14, wherein the agricultural composition has: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

43. The agricultural composition according to embodiment 1 or the process according to embodiment 14, wherein the agricultural composition has one or more properties chosen from: an amount of the one or more reaction products ranging from 36 wt. % to 48 wt. % of the total weight of the agricultural composition, an amount of reaction products of urea, ammonia, and formaldehyde ranging from 6 wt. % to 16 wt. %, an amount of dicyandiamide ranging from 6 wt. % to 16 wt. %, an amount of water ranging from 18 wt. % to 26 wt. %, an amount of propylene glycol ranging from 13 wt. % to 16 wt. %, an amount of dye ranging from 0 wt. % to 5 wt. %, a viscosity ranging from 100 cps to 200 cps, a pH ranging from 8.5 to 9.5, and a density ranging from 10.1 lb/gal to 10.7 lb/gal.

Example 1

To a reaction vessel was added 345.0966 g of propylene glycol, 526.2906 g of paraformaldehyde (95% purity, 16.649 mol formaldehyde equivalents), and 50.6782 g of a 28 wt. % ammonia in water solution (0.833 mol). The reaction vessel was heated to 75° C. Then, 641.24 g of dicyandiamide (7.627 mol) and 77.965 g of urea (1.298 mol) was added to the reaction vessel. The reaction vessel was held at 75° C. for 1 hour. Next, 446.9406 g of urea (7.440 mol) and 206.0386 g of a 28 wt. % ammonia in water solution (3.388 mol) was added to the reaction vessel. A dye was added (5.75 g) and the reaction vessel was held at 75° C. for 1 hour at which point a 1 liter aliquot was taken to give Sample 1A. The reaction vessel was held at 75° C. for an additional 1 hour at which point the reaction vessel was cooled to 25° C. to give Sample 1B. Sample 1A had a pH of 9.55, a viscosity of 118 cps, and a true density of 10.376 pounds/gallon of solution. Samples may be further distilled to remove about 6% water while maintaining good solubility.

The viscosity of various dilutions of Sample 1A and Sample 1B with water are depicted in Table 1.

TABLE 1

| Sample | Added Water (wt. %) | Viscosity (cps) |
|---|---|---|
| 4A | 3 | 75 |
| 3A | 2 | 86 |
| 2A | 1 | 96 |
| 1A | 0 | 116 |
| 6B | 5 | 60 |
| 5B | 4 | 67 |
| 4B | 3 | 82 |
| 3B | 2 | 93 |
| 2B | 1 | 106 |
| 1B | 0 | 129 |

Example 2

To a reaction vessel was added 225.063 g of deionized water, 343.233 g of paraformaldehyde (95% purity, 10.858 mol formaldehyde equivalents), and 33.051 g of a 28 wt. % ammonia in water solution (0.543 mol). The reaction vessel was heated to 75° ° C. Then, 418.200 g of dicyandiamide (4.974 mol) and 50.847 g of urea (0.846 mol) was added to the reaction vessel. The reaction vessel was held at 75° C. for 1 hour. Next, 291.483 g of urea (4.852 mol) and 134.373 g of the 28 wt. % ammonia in water solution (2.209 mol) was added to the reaction vessel. The reaction vessel was held at 75° C. for 2 hours at which point the reaction vessel was cooled to 25° C. to give Sample 2. Sample 2 had a pH of 8.90, a viscosity of 18 cps, and a weight of solids per gallon of 10.3 units. Sample 2 formed crystals when held at −15° C. overnight. Sample 2 may be further distilled to remove about 6% water while maintaining good solubility. Sample 2 may be used to treat a urea ammonia nitrate solution.

Example 3

To a reaction vessel was added 305.084 g of DMSO, 457.684 g of paraformaldehyde (95% purity, 14.5 mol formaldehyde equivalents), and 44.068 g of a 28 wt. % ammonia in water solution (0.73 mol). The reaction vessel was heated to 70° C. Then, 557.6 g of dicyandiamide (6.64 mol) and 67.796 g of urea (1.13 mol) was added to the reaction vessel. The reaction vessel was held at 70° C. for 1 hour. Next, 179.164 g of urea (2.99 mol) and 388.644 g of the 28 wt. % ammonia in water solution (6.40 mol) was added to the reaction vessel. The reaction vessel was held at 70° C. for 1 hour at which point the mixture was distilled to remove about 176 g of distillate. The remaining mixture was cooled to 25° C. to give Sample 3. Sample 3 had about 44% reaction products by NMR and a viscosity of about 4492 cPs. Application of Sample 3 to urea at a rate of 4 qt/ton resulted in an undesirably sticky substance.

Example 4

To a reaction vessel was added 305.084 g of propylene glycol (15.25 wt. %), 457.644 g of paraformaldehyde (95% purity, 22.88 wt. %, 14.49 mol formaldehyde equivalents), and 44.068 g of a 28 wt. % ammonia in water solution (0.73 mol; 2.2 wt. %). The reaction vessel was heated to 70° C. Then, 557.6 g of dicyandiamide (6.63 mol; 27.88 wt. %) and 67.796 g of urea (1.13 mol; 3.39 wt. %) was added to the reaction vessel. The reaction vessel was held at 70° C. for 1 hour. Next, 388.644 g of urea (6.47 mol; 8.96 wt. %) and 179.164 g of the 28 wt. % ammonia in water solution (2.95 mol; 19.43 wt. %) was added to the reaction vessel. The reaction vessel was held at 70° C. for 1 hour at which point the reaction vessel was cooled to 25° C. to give Sample 4A, and 0.25 wt. % dye was added. Removing about 5.6 wt. % water via distillation resulted in Sample 4B which had a viscosity of about 508 cPs. The sample had a pH of 9.52, a true density of 10.5 pounds/gallon, a refractive index of 1.5166, a reaction products content of 29.7 wt. %. Application of Sample 4 to urea at a rate of 4 qt/ton resulted in a dry and evenly coated material.

Example 5

To a reaction vessel was added 305.084 g of butyl carbitol (15.25 wt. %), 457.644 g of paraformaldehyde (95% purity, 22.88 wt. %, 14.49 mol formaldehyde equivalents), and 44.068 g of a 28 wt. % ammonia in water solution (0.73 mol; 2.2 wt. %). The reaction vessel was heated to 70° C. Then, 557.6 g of dicyandiamide (6.63 mol; 27.88 wt. %) and 67.796 g of urea (1.13 mol; 3.39 wt. %) was added to the reaction vessel. The reaction vessel was held at 70° C. for 1 hour. Next, 388.644 g of urea (6.47 mol; 8.96 wt. %) and 179.164 g of the 28 wt. % ammonia in water solution (2.95 mol; 19.43 wt. %) was added to the reaction vessel. The reaction vessel was held at 70° C. for 1 hour at which point the reaction vessel was cooled to 25° C. to give Sample 5, and 0.25 wt. % dye was added. Removing about 5.2 wt. % water via distillation resulted in a viscosity of about 540 cPs. The sample had a pH of 9.15, a true density of 10.34 pounds/gallon, a refractive index of 1.514, a reaction products content of 29.4 wt. %. Application of Sample 5 to urea at a rate of 4 qt/ton resulted in a dry and evenly coated material.

Example 6

To a reaction vessel was added 305.084 g of butyl cellosolve (15.25 wt. %), 457.644 g of paraformaldehyde (95% purity, 22.88 wt. %, 14.49 mol formaldehyde equivalents), and 44.068 g of a 28 wt. % ammonia in water solution (0.73 mol; 2.2 wt. %). The reaction vessel was heated to 70° C. Then, 557.6 g of dicyandiamide (6.63 mol; 27.88 wt. %) and 67.796 g of urea (1.13 mol; 3.39 wt. %) was added to the reaction vessel. The reaction vessel was held at 70° C. for 1 hour. Next, 388.644 g of urea (6.47 mol; 8.96 wt. %) and 179.164 g of the 28 wt. % ammonia in water solution (2.95 mol; 19.43 wt. %) was added to the reaction vessel. The reaction vessel was held at 70° C. for 1 hour and 115.2 g of distillate was removed via distillation. The reaction vessel was cooled to 25° C. to give Sample 6, and 0.25 wt. % dye was added. Sample 6 had a viscosity of about 300 cPs, a pH of 9.25, a true density of 10.25 pounds/gallon, a refractive index of 1.5101, and a reaction products content of 29.4 wt. %. Application of Sample 6 to urea at a rate of 4 qt/ton resulted in a dry and evenly coated material.

Example 7

Example 7: 474.5 g (94.9 wt. %) of CENTURO® was mixed with 25.5 g (5.1 wt. %) of N-(n-butyl)thiophosphoric triamide (98% purity) to afford Sample 7. Sample 7 had a pH of 9.8, viscosity of 37 cPs, true density of 10.506 pounds/gallon, and a specific gravity of 1.2628. The sample resulted in a water clear liquid that did not separate after storage for over 1 year.

Example 8

Example 8: To a reaction vessel was added 436.5569 g of a 50 wt. % formaldehyde solution in water (7.28 mol; 33.58 wt. %). The reaction vessel was heated to 60° C. and 26 g of a 28 wt. % ammonia in water solution (0.43 mol; 2.00 wt. %) was added. The reaction vessel was allowed to cool to 40° C. and 234 g of dicyandiamide (2.79 mol; 18.00 wt. %) and 56.1041 g of urea (0.94 mol; 4.32 wt. %) was added to the reaction vessel. The reaction vessel was heated to 70° C. and the pH was adjusted to 9.94 with NaOH. The reaction vessel was held at 70° C. for 30 minutes. Next, 224.4242 g of urea (3.74 mol; 17.26 wt. %) and 98.9703 g of a 28 wt. % ammonia in water solution (1.63 mol; 7.61 wt. %) was added to the reaction vessel. The reaction vessel was held at 70° C. for 30 minutes at which point the mixture was distilled to remove about 611 g of distillate. Next, 223.9445 g of NMP was added and the reaction was cooled to 25° C. to afford Sample 8 having a pH of 9.8, a refractive index of 1.5226, and a viscosity of 172 cPs. Karl Fischer titration showed Sample 9 to be 9.35% water.

Example 9

Example 9: To a reaction vessel was added 167.424 g of a 28 wt. % ammonia in water solution (2.75 mol; 11.16 wt. %). 352.504 g of paraformaldehyde (92.5% purity, 23.5 wt. %, 10.87 mol formaldehyde equivalents) was slowly added for exothermic control. The reaction vessel was heated to 75° C. Then, 418.2 g of dicyandiamide (4.98 mol; 27.88 wt. %) and 50.847 g of urea (0.85 mol; 3.39 wt. %) was added to the reaction vessel. The reaction vessel was held at 75° C. for 1 hour. Next, 291.513 g of urea (4.86 mol; 19.43 wt. %) was added to the reaction vessel. The reaction vessel was held at 75° C. for 2 hours at which point the reaction vessel was cooled to 50° C. and held at 50° ° C. for 30 minutes. The reaction vessel was cooled to 25° C. at which point 215.757 g of propylene glycol (14.38 wt. %) was added and the reaction proceeded for 15 minutes. K3-B Purple Dye was added to afford Sample 9. Sample 9 had a pH of 9.0, viscosity of 130 cps, and a true density of 10.3 pounds/gallon. The composition of Sample 9 is depicted in Table 2 in comparison to CENTURO®.

TABLE 2

| Components | Sample 9 (wt. %) | CENTURO® (wt. %) |
|---|---|---|
| Reaction product of formaldehyde, urea, ammonia, and DCD | 37.7 | 14 |
| Reaction product of formaldehyde, urea, and ammonia | 13.27 | 48.5 |
| DCD | 12.5 | 2.5 |
| Propylene glycol | 14.38 | 0 |
| Water | 22 | 35 |
| Dye | 0.15 | 0 |
| Total | 100 | 100 |

Additional compositions were prepared similar to the examples provided above. Tables 3 and 4 summarize various aspects of those compositions. "F" reflects addition of the solvent before the first reaction time. "B" reflects addition of the solvent after the second reaction time. "Hyde" refers to either paraformaldehyde (92.5 or 95%) or formaldehyde (50%). Stable refers to a clear, precipitate free compositions from the time of synthesis to the time of reporting at the following temperatures: −15° C., 0° C., 25° C., 45° C.

TABLE 3

| Hyde weight % | % Hyde | DCD weight % | NH4OH | Ammonia weight % | Urea | Urea weight % | Extra NH4OH | Solvent | Viscosity, cp | Distilled (Y/N) | Observations on Stability |
|---|---|---|---|---|---|---|---|---|---|---|---|
| 27.5816 | 50 | 24.5 | | 9.6131 | | 19.2262 | | NMP B | 18.7 | No | n/a |
| 27.5816 | 50 | 24.5 | | 9.6131 | | 19.2262 | | NMP B | 66 | Yes | n/a |
| 33.5817 | 50 | 18 | | 9.6131 | | 21.5787 | | NMP B | 100 | Yes | Not stable in −15 C. |
| 33.5817 | 50 | 18 | Split | 9.6131 | | 21.5787 | | NMP B | | Yes | 15% AND 20% NMP stable |
| 33.5817 | 50 | 18 | Split | 9.6131 | Split | 21.5791 | | NMP B | | Yes | 15% AND 20% NMP stable |
| 33.5817 | 50 | 18 | Split | 9.6131 | Split | 21.5791 | | NMP 8 | | Yes | 15% AND 20% NMP stable |
| 31.6808 | 50 | 16.98 | Split | 14.7297 | Split | 20.3573 | | NMP B | | Yes | Stable temporarily |
| 40.5706 | 50 | 21.75 | Split | 11.6137 | Split | 26.0696 | | Water | | No | Not stable |
| 33.5817 | 50 | 18 | Split | 9.6131 | Split | 21.5791 | | NMP B | | Yes | Stable |
| 33.5813 | 50 | 18 | Split | 9.6131 | Split | 21.5791 | | NMP, PG, DMF B | 587, 1342, 204 | Yes | Stable |
| 33.5813 | 50 | 18 | Split | 9.6131 | Split | 21.5791 | | NMP, PG, DMSO, B | 1029, 534, 319 | Yes | Stable |
| 17.6744 | 95 | 20 | Split | 9.6131 | Split | 19.5791 | | DMSO F | 50 | No | Stable |
| 17.6744 | 50 | 18 | Split | 9.6131 | Split | 19.5791 | | NMP B | 120 | Yes | Stable temporarily |
| 17.6744 | 95 | 20 | Split | 9.6131 | Split | 19.5791 | | NMP B | 320 | Yes | Good −15 C. for a year |
| 22.8822 | 95 | 27.88 | Split | 11.16161 | Split | 22.822 | | Water | 21 | No | Not stable |
| 22.8822 | 95 | 27.88 | Split | 11.1616 | Split | 22.822 | | DMSO F | | | Not stable |
| 22.8822 | 95 | 27.88 | Split | 11.1616 | Split | 22.822 | | DMSO F | 5320 | Yes | Not stable |
| 20.6744 | 95 | 20 | Split | 9.6131 | Split | 19.5791 | | Tamisolve F | 170 | No | Stable |
| 20.6744 | 95 | 20 | Split | 9.6131 | Split | 19.5791 | | PG F | 92 | No | Stable |
| 26.4400 | 95 | 26.93 | Split | 14.38 | Split | 32.25 | | DMSO F | 474 | Yes | Stable |
| 26.4400 | 95 | 26.93 | Split | 14.38 | Split | 32.25 | | PG F | 574 | Yes | Stable |
| 22.8822 | 95 | 27.88 | Split | 11.1666 | Split | 17.1114 | | DMSO F | | Yes | Slightly stable |
| 22.8822 | 95 | 27.88 | Split | 11.1616 | Split | 22.822 | | Butyl Carbitol F | 540 | Yes | Stable for some time |

TABLE 3-continued

| Hyde weight % | % Hyde | DCD weight % | NH4OH | Ammonia weight % | Urea | Urea weight % | Extra NH4OH | Solvent | Viscosity, cp | Distilled (Y/N) | Observations on Stability |
|---|---|---|---|---|---|---|---|---|---|---|---|
| 22.8822 | 95 | 27.88 | Split | 11.1616 | Split | 22.822 | | Butyl Cellusolve F | 300 | Yes | Stable short time |
| 22.8822 | 95 | 27.88 | Split | 11.1616 | Split | 22.822 | | PG F | 114 | No | Stable at room |
| 22.8822 | 95 | 27.88 | Split | 11.1616 | Split | 22.822 | | PG F | 479 | Yes | Stable at −15 C. |
| 22.8822 | 95 | 27.88 | Split | 11.1616 | Split | 22.822 | | PG F | 129 | No | Stable |
| 22.8822 | 95 | 27.88 | Split | 11.1616 | Split | 22.822 | | PG F | | No | Stable |
| 22.8822 | 95 | 25 | Split | 11.1616 | Split | 25.702 | | PG F | 113 | No | Stable |
| 22.8822 | 95 | 27.88 | Split | 11.1616 | Split | 22.822 | | PG F | 18, 130, 138, 13 | No | Stable |
| 22.8822 | 95 | 27.88 | Split | 11.1616 | Split | 22.822 | | Water | 18 | No | Not Stable |
| 22.8822 | 95 | 27.88 | Split | 11.1616 | Split | 22.822 | | NMP | 135 | No | Stable |

TABLE 4

| Hyde weight % | % Hyde | DCD weight % | NH4OH | Ammonia weight % | Urea | Urea weight % | Extra NH4OH | Solvent | Viscosity, cp | Distilled (Y/N) | Observations on Stability |
|---|---|---|---|---|---|---|---|---|---|---|---|
| 23.5006 | 92.5 | 27.88 | NH4OH F | 11.1616 | Split | 22.824 | | PG B | 107 | No | Stable for long time |
| 23.5006 | 92.5 | 27.88 | NH4OH F | 11.1616 | Split | 22.824 | 14.40% | Water | 17 | No | Stable short time |
| 23.5006 | 92.5 | 27.88 | NH4OH F | 11.1616 | Split | 22.824 | 12.00% | PG B | 21 | No | Stable short time |
| 23.5006 | 92.5 | 27.88 | NH4OH F | 11.1616 | Split | 22.824 | 9.00% | PG B | 31 | No | Stable short time |
| 23.5006 | 92.5 | 27.88 | NH4OH F | 11.1616 | Split | 22.824 | 6.00% | PG B | 47 | No | Stable short time |
| 23.5006 | 92.5 | 27.88 | NH4OH F | 11.1616 | Split | 22.824 | 3.00% | PG B | 76 | No | Stable short time |
| 23.5006 | 92.5 | 27.88 | NH4OH F | 11.1616 | Split | 22.824 | | Sosketal B | 152 | No | Stable |
| 23.5006 | 92.5 | 27.88 | NH4OH F | 11.1616 | Split | 22.824 | 3% | PG B | | No | Stable |
| 23.5006 | 92.5 | 27.88 | NH4OH F | 11.1616 | Split | 22.824 | 3% | PG B | | No | Stable |
| 23.5006 | 92.5 | 27.88 | NH4OH F | 11.1616 | Split | 22.824 | 3% | PG B | | No | Stable |
| 23.5006 | 92.5 | 27.88 | NH4OH F | 11.1616 | Split | 22.824 | 3% | PG B | | No | Stable |
| 23.5006 | 92.5 | 27.88 | NH4OH F | 11.1616 | Split | 22.824 | | PG B | 123 | No | Stable |
| 23.5006 | 92.5 | 27.88 | NH4OH F | 11.1616 | Split | 22.824 | | PG B | 124 | No | Stable |
| 23.5006 | 92.5 | 27.88 | Split | 11.1616 | Split | 22.824 | | PG B | | No | Stable |
| 23.5006 | 92.5 | 27.88 | Split | 11.1616 | Split | 22.824 | | PG B | 120 | No | Stable |
| 23.5006 | 92.5 | 27.88 | Split | 11.1616 | Split | 22.824 | | PG B | 120 | No | Stable |

Examples 10 to 26 are additional exemplary examples. Various properties of these examples are in Tables 5 to 7.

Example 10

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 1 hour. Next, 388.684 g of urea (6.472 mol) was added over 16 minutes to the vessel and held for 4 hrs at 72° C. taking sample 10A at 0.5 hour, sample 10B at 1 hour, sample 10C at 2 hours, sample 10D at 3 hours and sample 10E at 4 hours. To each sample, 14.4838% by weight of propylene glycol (PG) was added at 25° C.

Example 11

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° ° C. and held for 2 hours. Next, 388.684 g of urea (6.472 mol) was added over 16 minutes to the vessel and held for 1 hr at 72° C. The reaction vessel was cooled to 50° C. and 855 g of sample removed (sample 11A), cooled to 25° C. with ice bath and added 13.4838% by weight propylene glycol. 20 g of ammonium hydroxide (0.329 mol) was added to the remaining material in the vessel and held for 30 minutes at 50° ° C. The reaction vessel content was then cooled to 25° C. and added 13.4838% by weight propylene glycol (sample 11B).

Example 12

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 2 hours. Next, 388.684 g of urea (6.472 mol) was added over 16 minutes to the vessel and held for 2 hrs at 72° C. The reaction vessel was cooled to 50° C. and 855 g of sample removed (sample 12A), cooled to 25° C. with ice bath and 13.4838% by weight propylene glycol was added. 20 g of ammonium hydroxide (0.329 mol) was added to the content in the vessel and held for 30 minutes at 50° C. The reaction vessel content was then cooled to 25° C. and 13.4838% by weight propylene glycol was added (sample 12B).

Example 13

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 1 hour. Next, 388.684 g of urea (6.472 mol) was added over 16 minutes to the vessel and held for 3 hrs at 72° C. The reaction vessel was cooled to 50° C. and 20 g of ammonium hydroxide (0.329 mol) was added to the vessel and held for 30 minutes at 50° C. The reaction vessel content was then cooled to 25° C. and 14.4838% by weight propylene glycol was added.

Example 14

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 1 hour. Next, 388.684 g of urea (6.472 mol) was added over 16 minutes to the vessel and held for 3 hrs at 72° C. The reaction vessel was cooled to 50° C. and 20 g of ammonium hydroxide (0.329 mol) was added to the content in the vessel and held for 60 minutes. The reaction vessel content was then cooled to 25° C. and 14.4838% by weight propylene glycol was added.

Example 15

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 1 hour. Next, 388.684 g of urea (6.472 mol) was added over 16 minutes to the vessel and held for 3 hrs at 72° C. The reaction vessel was cooled to 50° C. and a 570 g sample was removed (sample 15A), cooled to 25° C. with ice bath and 13.4838% by weight propylene glycol was added. 20 g of ammonium hydroxide (0.329 mol) was added to the content in the vessel and held for 120 minutes. A 570 g sample was removed (sample 15B), cooled to 25° C. with ice bath and added 13.4838% by weight propylene glycol. The reaction vessel content was then stirred an additional 60 min, cooled to 25° C. and 14.4838% by weight propylene glycol was added.

Example 16

To a reaction vessel was added 279.04 g of 28% ammonium hydroxide (4.588 mol), 587.515 g of 92.5% paraformaldehyde slowly without any heat applied. The reaction vessel was then adjusted to 45° C. and 697 g of dicyandiamide (8.291 mol) was added over 19 minutes followed by 84.745 g of urea (1.4110 mol) over 4 minutes. The reaction vessel was heated to 72° C. and held for 1 hour. Next, 485.855 g of urea (8.0895 mol) was added over 16 minutes to the vessel and held for 4 hrs at 72° C. The reaction vessel was cooled to 50° C. and a 427.6 g sample was removed (sample 7A), cooled to 25° C. with ice bath and 13.4838% by weight propylene glycol was added. 20 g of ammonium hydroxide (0.329 mol) was added to the content in the vessel and held 50° C. for 180 minutes total taking 427.6 g samples after 30 min (sample 16B), 60 min (sample 16C), 120 min (sample 16D) and 180 min (sample 16E). After each sample was taken, the sample was then cooled to 25° C. and 14.4838% by weight propylene glycol was added.

Example 17

To a reaction vessel was added 279.04 g of 28% ammonium hydroxide (4.588 mol), 587.515 g of 92.5% paraformaldehyde slowly without any heat applied. The reaction vessel was then adjusted to 45° C. and 697 g of dicyandiamide (8.291 mol) was added over 19 minutes followed by 84.745 g of urea (1.4110 mol) over 4 minutes. The reaction vessel was heated to 72° C. and held for 1 hour. Next, 485.855 g of urea (8.0895 mol) was added over 16 minutes to the vessel and held for 3 hrs at 80° C. Samples were removed (713 g) at 1 hr (sample 17A) and 2 hrs (713 g, sample 17B). The reaction vessel was cooled to 50° C. and 20 g of ammonium hydroxide (0.1598 mol) was added to the content in the vessel and held for 30 minutes (sample 17C). The reaction vessel content was then cooled to 25° C. and 14.4838% by weight propylene glycol was added.

Example 18

To a reaction vessel was added 279.04 g of 28% ammonium hydroxide (4.588 mol), 587.515 g of 92.5% paraformaldehyde slowly without any heat applied. The reaction vessel was then adjusted to 45° C. and 697 g of dicyandiamide (8.291 mol) was added over 19 minutes followed by 84.745 g of urea (1.4110 mol) over 4 minutes. The reaction vessel was heated to 72° C. and held for 1 hour. Next, 485.855 g of urea (8.0895 mol) was added over 16 minutes to the vessel and held at 85° C. A sample was removed (713 g) at 1 hr (sample 18A) and at 2 hrs (475 g, sample 18B) and cooled to 25° C. and the correct amount of propylene glycol ("PG") (14.4838% by weight) was added. The reaction vessel was cooled to 50° C. and 20 g of ammonium hydroxide (0.329 mol) was added to the content in the vessel and held for 30 minutes. A sample was removed after the 30 min hold (475 g, sample 18C) cooled to 25° C. and PG was added. The rest of the contents of the vessel was held at 50°

C. for additional 30 min and cooled to 25° C. where 14.4838% by weight PG was added (sample 18D).

Example 19

To a reaction vessel was added 279.04 g of 28% ammonium hydroxide (4.588 mol), 587.515 g of 92.5% paraformaldehyde slowly without any heat applied. The reaction vessel was then adjusted to 45° C. and 697 g of dicyandiamide (8.291 mol) was added over 19 minutes followed by 169.49 g of urea (2.8220 mol) over 8 minutes. The reaction vessel was heated to 72° C. and held for 1 hour. Next, 401.11 g of urea (6.678 mol) was added over 12 minutes to the vessel and held for 3 hrs at 75° C. Samples (712.66 grams each) were removed at 1 hr (sample 19A) and 2 hrs (sample 19B), cooled to 25° C., and 14.4838% by weight PG was added. The reaction vessel was cooled to 25° C. at the end of the 3 hour hold and 14.4838% by weight PG was added (sample 19C).

Example 20

To a reaction vessel was added 279.04 g of 28% ammonium hydroxide (4.588 mol), 587.515 g of 92.5% paraformaldehyde slowly without any heat applied. The reaction vessel was then adjusted to 45° C. and 697 g of dicyandiamide (8.291 mol) was added over 19 minutes followed by 84.745 g of urea (1.4110 mol) over 4 minutes. The reaction vessel was heated to 72° C. and held for 1 hour. 1098.87 grams of the content was removed and the following performed:

First, 161.95 grams (2.696 moles) of urea was added to the remaining content (549.43 grams) in the vessel and held for one hour at 75° C. The vessel was the cooled to 50° C. and 8.3 g of urea (0.1382 moles) was added and held for 30 minutes before cooling to 25° C., and then adding 14.4838% by weight PG (sample 20A).

Second, 549.43 grams of the 1098.87 grams removed from the vessel was added to an empty vessel, heated to 75° C., added 161.95 grams of urea (2.6965 moles) and held for 2 hours. The content was cooled to 50° C., and 8.3 grams of urea (0.1382 mol) was added and held for 30 minutes. After the 30 minutes, the content was cooled to 25° C., and PG (14.4838% by weight) was added (sample 20B).

Third, 549.43 grams of the 1098.87 grams pulled from the vessel was added to an empty vessel, heated to 75° C., 161.95 grams (2.6965 moles) of urea was added and held for 3 hours. The content was cooled to 50° C., and urea 8.3 grams (0.1382 mol) was added and held for 30 minutes. After the 30 minutes, the content was cooled to 25° C., and PG (14.4838% by weight) was added (sample 20C).

Example 21

To a reaction vessel was added 334.848 g of 28% ammonium hydroxide (5.505 mol), 705.018 g of 92.5% paraformaldehyde slowly without any heat applied. The reaction vessel was then adjusted to 45° C. and 836.4 g of dicyandiamide (9.97 mol) was added over 19 minutes followed by 101.694 g of urea (1.6932 mol) over 4 minutes. The reaction vessel was heated to 72° C. and held for 1 hour. Next, 583.026 g of urea (9.7084 mol) was added over 16 minutes to the vessel and held for 3 hrs at 72° ° C. The content was cooled to 25° C., and 14.4838% by weight PG added. The product was divided into 6 equal samples.

Sample 21A: As is pH 9.
Sample 21B: As is with purple dye (0.15% by weight) pH 9.
Sample 21C: pH adjusted with 50% NaOH to 9.54.
Sample 21D: pH adjusted with 50% NaOH to 9.54 and purple dye (0.15% by weight) was added.
Sample 21E: pH adjusted with 50% NaOH to 10.29 with 50% NaOH.
Sample 21F: pH adjusted with 50% NaOH to 10.29 and purple dye (0.15% by weight) was added.

Example 22

To a reaction vessel was added 334.848 g of 28% ammonium hydroxide (5.505 mol), 705.018 g of 92.5% paraformaldehyde slowly without any heat applied. The reaction vessel was then adjusted to 45° C. and 836.4 g of dicyandiamide (9.948 mol) was added over 19 minutes followed by 101.694 g of urea (1.6932 mol) over 4 minutes. The reaction vessel was heated to 72° C. and held for 1 hour. Next, 583.026 g of urea (9.707 mol) was added over 16 minutes to the vessel and held for 3 hrs at 72° C. The content was cooled to 25° C., and 14.4838% by weight PG added. The product was divided into 6 samples.

Sample 22A: As is pH 8.98.
Sample 22B: As is with purple dye (0.15% by weight) pH 8.98.
Sample 22C: pH adjusted with 50% NaOH to 9.86.
Sample 22D: pH adjusted with 50% NaOH to 9.86 and purple dye (0.15% by weight) was added.
Sample 22E: pH adjusted with 50% NaOH to 10.56 with 50% NaOH.
Sample 22F: pH adjusted with 50% NaOH to 10.56 and purple dye (0.15% by weight) was added.

Example 23

To a reaction vessel was added 223.2320 g of 28% ammonium hydroxide (3.67 mol), 470.012 g of 92.5% paraformaldehyde slowly without any heat applied. The reaction vessel was then adjusted to 45° C. and 557.6 g of dicyandiamide (6.632 mol) was added over 19 minutes followed by 67.796 g of urea (1.1288 mol) over 4 minutes. The reaction vessel was heated to 72° C. and held for 1 hour. Next, 388.684 g of urea (6.472 mol) was added over 16 minutes to the vessel and held at 72° C. A 855 g sample was removed at 1 hour (sample 23A), cooled and 14.4838% by weight PG was added. After 4 hours, the contents in the vessel were cooled to 25° C. and 14.4838% by weight PG was to generate sample 23B.

Example 24

To a reaction vessel was added 334.848 g of 28% ammonium hydroxide (5.505 mol), 600 g of 92.5% paraformaldehyde slowly without any heat applied. The reaction vessel was then adjusted to 45° C. and 836.4 g of dicyandiamide (9.9477 mol) was added over 19 minutes followed by 101.694 g of urea (1.6932 mol) over 4 minutes. The reaction vessel was heated to 72° C. and held for 1 hour. Next, 583.026 g of urea (9.7074 mol) was added over 16 minutes to the vessel and held for 3 hrs at 72° C. Sample was removed at 2-hour hold.

Sample 24A: 613.9 grams sample+108 grams of PG after cooling to 25° C. in ice bath.
Sample 24B: 613.9 grams sample+134.9 grams of PG after cooling to 25° C. in ice bath. At the end of the 3-hour hold, the remaining vessel content was cooled to 25° C.

Sample 24C: 613.9 grams from vessel+108 grams of PG was added.

Sample 24D: 613.9 grams+134.9 grams of PG was added.

Example 25

To a reaction vessel was added 223.232 g of 28% ammonium hydroxide (3.67 mol), 705.018 g of 92.5% paraformaldehyde slowly without any heat applied. The reaction vessel was then adjusted to 45° C. and 836.4 g of dicyandiamide (9.9477 mol) was added over 19 minutes followed by 101.694 g of urea (1.6932 mol) over 4 minutes. The reaction vessel was heated to 72° C. and held for 1 hour. Next, 583.026 g of urea (9.7074 mol) was added over 16 minutes to the vessel and held at 72° C. Sample (855 g) was removed at 2 hour of the hold (sample 25A), cooled, and added 14.4838% by weight PG. The remining material in the vessel was stirred for an additional 1 hour, cooled to 25° C., and 14.4838% by weight PG added (sample 25B).

Example 26

To a reaction vessel was added 334.848 g of 28% ammonium hydroxide (5.505 mol), 600 g of 92.5% paraformaldehyde slowly without any heat applied. The reaction vessel was then adjusted to 45° C. and 836.4 g of dicyandiamide (9.9477 mol) was added over 19 minutes followed by 101.694 g of urea (1.6932 mol) over 4 minutes. The reaction vessel was heated to 72° C. and held for 1 hour. Next, 583.026 g of urea (9.7074 mol) was added over 16 minutes to the vessel and held for 3 hrs at 72° C. The vessel material was divided into 17 samples for studing stability at −15° C., 0° C., 25° C., and 45° C.

Sample 26A: 136.8 g from vessel+14.4838% by weight solvent (⅓ Diethylene glycol butyl ether and ⅔ propylene glycol).

Sample 26B: 136.8 g from vessel+14.4838% by weight solvent (⅔ Diethylene glycol butyl ether and ⅓ propylene glycol).

Sample 26C: 136.8 g from vessel+14.4838% by weight solvent (Diethylene glycol butyl ether).

Sample 26D: 136.8 g from vessel+14.4838% by weight solvent (⅓ Diethylene glycol methyl ether and ⅔ propylene glycol).

Sample 26E: 136.8 g from vessel+14.4838% by weight solvent (⅔ Diethylene glycol methyl ether and ⅓ propylene glycol).

Sample 26F: 136.8 g from vessel+14.4838% by weight solvent (Diethylene glycol methyl ether).

Sample 26G: 136.8 g from vessel+14.4838% by weight solvent (⅓ Ethylene glycol butyl ether and ⅔ propylene glycol).

Sample 26H: 136.8 g from vessel+14.4838% by weight solvent (⅔ Ethylene glycol butyl ether and ⅓ propylene glycol).

Sample 26I: 136.8 g from vessel+14.4838% by weight solvent (Ethylene glycol butyl ether).

Sample 26J: 136.8 g from vessel+14.4838% by weight solvent (⅓ NMP and ⅔ propylene glycol).

Sample 26K: 136.8 g from vessel+14.4838% by weight solvent (⅔ NMP and ⅓ propylene glycol).

Sample 26L: 136.8 g from vessel+14.4838% by weight solvent (NMP).

Sample 26M: 136.8 g from vessel+14.4838% by weight solvent (⅓ DMSO and ⅔ propylene glycol).

Sample 26N: 136.8 g from vessel+14.4838% by weight solvent (⅔ DMSO and ⅓ propylene glycol).

Sample 26O: 136.8 g from vessel+14.4838% by weight solvent (DMSO).

Sample 26P: 136.8 g from vessel without any additional solvent.

Sample 26Q: 205.2 g from vessel with 14.4838% by weight propylene glycol.

Tables 5 to 7 depict exemplary reaction compositions, reaction conditions, and stability for Examples 10-26.

TABLE 5

| Sample Number | Mole Ratios | | | | | |
| --- | --- | --- | --- | --- | --- | --- |
| | Paraformaldehyde | Urea 1 | Urea 2 | Urea 3 | Ammonia | DCD |
| 10A | 1 | 0.078 | 0.447 | | 0.25 | 0.46 |
| 10B | 1 | 0.078 | 0.447 | | 0.25 | 0.46 |
| 10C | 1 | 0.078 | 0.447 | | 0.25 | 0.46 |
| 10D | 1 | 0.078 | 0.447 | | 0.25 | 0.46 |
| 10E | 1 | 0.078 | 0.447 | | 0.25 | 0.46 |
| 11A | 1 | 0.078 | 0.447 | | 0.25 | 0.46 |
| 11B | 1 | 0.078 | 0.447 | | 0.3 | 0.46 |
| 12A | 1 | 0.078 | 0.447 | | 0.25 | 0.46 |
| 12B | 1 | 0.078 | 0.447 | | 0.3 | 0.46 |
| 13 | 1 | 0.078 | 0.447 | | 0.28 | 0.46 |
| 14 | 1 | 0.078 | 0.447 | | 0.25 | 0.46 |
| 15A | 1 | 0.078 | 0.447 | | 0.25 | 0.46 |
| 15B | 1 | 0.078 | 0.447 | | 0.288 | 0.46 |
| 15C | 1 | 0.078 | 0.447 | | 0.288 | 0.46 |
| 16A | 1 | 0.078 | 0.447 | | 0.25 | 0.46 |
| 16B | 1 | 0.078 | 0.447 | | 0.276 | 0.46 |
| 16C | 1 | 0.078 | 0.447 | | 0.276 | 0.46 |
| 16D | 1 | 0.078 | 0.447 | | 0.276 | 0.46 |
| 16E | 1 | 0.078 | 0.447 | | 0.276 | 0.46 |
| 17A | 1 | 0.078 | 0.449 | | 0.273 | 0.46 |
| 17B | 1 | 0.078 | 0.449 | | 0.273 | 0.46 |
| 17C | 1 | 0.078 | 0.449 | | 0.31 | 0.46 |
| 18A | 1 | 0.078 | 0.449 | | 0.25 | 0.46 |
| 18B | 1 | 0.078 | 0.449 | | 0.25 | 0.46 |
| 18C | 1 | 0.078 | 0.449 | | 0.314 | 0.46 |
| 18D | 1 | 0.078 | 0.449 | | 0.314 | 0.46 |
| 19A | 1 | 0.156 | 0.37 | | 0.25 | 0.46 |
| 19B | 1 | 0.156 | 0.37 | | 0.25 | 0.46 |
| 19C | 1 | 0.156 | 0.37 | | 0.25 | 0.46 |
| 20A | 1 | 0.078 | 0.448 | 0.023 | 0.25 | 0.46 |
| 20B | 1 | 0.078 | 0.448 | 0.023 | 0.25 | 0.46 |
| 20C | 1 | 0.078 | 0.448 | 0.023 | 0.25 | 0.46 |
| 21A | 1 | 0.078 | 0.447 | | 0.25 | 0.46 |
| 21B | 1 | 0.078 | 0.447 | | 0.25 | 0.46 |
| 21C | 1 | 0.078 | 0.447 | | 0.25 | 0.46 |
| 21D | 1 | 0.078 | 0.447 | | 0.25 | 0.46 |
| 21E | 1 | 0.078 | 0.447 | | 0.25 | 0.46 |
| 21F | 1 | 0.078 | 0.447 | | 0.25 | 0.46 |
| 22A | 1 | 0.078 | 0.447 | | 0.25 | 0.46 |
| 22B | 1 | 0.078 | 0.447 | | 0.25 | 0.46 |
| 22C | 1 | 0.078 | 0.447 | | 0.25 | 0.46 |
| 22D | 1 | 0.078 | 0.447 | | 0.25 | 0.46 |
| 22E | 1 | 0.078 | 0.447 | | 0.25 | 0.46 |
| 22F | 1 | 0.078 | 0.447 | | 0.25 | 0.46 |
| 23A | 1 | 0.078 | 0.447 | | 0.25 | 0.46 |
| 23B | 1 | 0.078 | 0.447 | | 0.25 | 0.46 |
| 24A | 1 | 0.092 | 0.525 | | 0.3 | 0.54 |
| 24B | 1 | 0.092 | 0.525 | | 0.3 | 0.54 |
| 24C | 1 | 0.092 | 0.525 | | 0.3 | 0.54 |
| 24D | 1 | 0.092 | 0.525 | | 0.3 | 0.54 |
| 25A | 1 | 0.078 | 0.447 | | 0.17 | 0.46 |
| 25B | 1 | 0.078 | 0.447 | | 0.17 | 0.46 |
| 26A | 1 | 0.092 | 0.525 | | 0.3 | 0.54 |
| 26B | 1 | 0.092 | 0.525 | | 0.3 | 0.54 |
| 26C | 1 | 0.092 | 0.525 | | 0.3 | 0.54 |
| 26D | 1 | 0.092 | 0.525 | | 0.3 | 0.54 |
| 26E | 1 | 0.092 | 0.525 | | 0.3 | 0.54 |
| 26F | 1 | 0.092 | 0.525 | | 0.3 | 0.54 |
| 26G | 1 | 0.092 | 0.525 | | 0.3 | 0.54 |
| 26H | 1 | 0.092 | 0.525 | | 0.3 | 0.54 |
| 26I | 1 | 0.092 | 0.525 | | 0.3 | 0.54 |
| 26J | 1 | 0.092 | 0.525 | | 0.3 | 0.54 |
| 26K | 1 | 0.092 | 0.525 | | 0.3 | 0.54 |
| 26L | 1 | 0.092 | 0.525 | | 0.3 | 0.54 |

TABLE 5-continued

| | Mole Ratios | | | | | |
|---|---|---|---|---|---|---|
| Sample Number | Paraformaldehyde | Urea 1 | Urea 2 | Urea 3 | Ammonia | DCD |
| 26M | 1 | 0.092 | 0.525 | | 0.3 | 0.54 |
| 26N | 1 | 0.092 | 0.525 | | 0.3 | 0.54 |
| 26O | 1 | 0.092 | 0.525 | | 0.3 | 0.54 |
| 26P | 1 | 0.092 | 0.525 | | 0.3 | 0.54 |
| 26Q | 1 | 0.092 | 0.525 | | 0.3 | 0.54 |

TABLE 6

| Sample Number | DCD/urea addition temp | Reaction Parameters | | | | 50 C. hold time | NH3 Post-add |
|---|---|---|---|---|---|---|---|
| | | Hold 1 temp | Hold 1 time | Hold 2 temp | Hold 2 time | | |
| 10A | 45 | 72 | 1 hr | 72 | 30 min | | |
| 10B | 45 | 72 | 1 hr | 72 | 1 hr | | |
| 10C | 45 | 72 | 1 hr | 72 | 2 hr | | |
| 10D | 45 | 72 | 1 hr | 72 | 3 hr | | |
| 10E | 45 | 72 | 1 hr | 72 | 4 hr | | |
| 11A | 45 | 72 | 2 hr | 72 | 1 hr | | |
| 11B | 45 | 72 | 2 hr | 72 | 1 hr | 30 min | yes |
| 12A | 45 | 72 | 2 hr | 72 | 2 hr | | |
| 12B | 45 | 72 | 2 hr | 72 | 2 hr | 30 min | yes |
| 13 | 45 | 72 | 1 hr | 72 | 3 hr | 30 min | yes |
| 14 | 45 | 72 | 1 hr | 72 | 3 hr | 1 hr | yes |
| 15A | 45 | 72 | 1 hr | 72 | 3 hr | | |
| 15B | 45 | 72 | 1 hr | 72 | 3 hr | 2 hr | yes |
| 15C | 45 | 72 | 1 hr | 72 | 3 hr | 3 hr | yes |
| 16A | 45 | 72 | 1 hr | 72 | 4 hr | | |
| 16B | 45 | 72 | 1 hr | 72 | 4 hr | 30 min | yes |
| 16C | 45 | 72 | 1 hr | 72 | 4 hr | 1 hr | yes |
| 16D | 45 | 72 | 1 hr | 72 | 4 hr | 2 hr | yes |
| 16E | 45 | 72 | 1 hr | 72 | 4 hr | 3 hr | yes |
| 17A | 45 | 72 | 1 hr | 80 | 1 hr | | |
| 17B | 45 | 72 | 1 hr | 80 | 2 hr | | |
| 17C | 45 | 72 | 1 hr | 80 | 3 hr | 30 min | yes |
| 18A | 45 | 72 | 1 hr | 85 | 1 hr | | |
| 18B | 45 | 72 | 1 hr | 85 | 2 hr | | |
| 18C | 45 | 72 | 1 hr | 85 | 2 hr | | |
| 18D | 45 | 72 | 1 hr | 85 | 2 hr | 30 min | yes |
| 19A | 45 | 72 | 1 hr | 75 | 1 hr | | |
| 19B | 45 | 72 | 1 hr | 75 | 2 hr | | |
| 19C | 45 | 72 | 1 hr | 75 | 3 hr | | |
| 20A | 45 | 72 | 1 hr | 75 | 1 hr + 30 min post urea 3 | | |
| 20B | 45 | 72 | 1 hr | 75 | 2 hr + 30 min post urea 3 | | |
| 20C | 45 | 72 | 1 hr | 75 | 3 hr + 30 min post urea 3 | | |
| 21A | 45 | 72 | 1 hr | 72 | 3 hr | | |
| 21B | 45 | 72 | 1 hr | 72 | 3 hr | | |
| 21C | 45 | 72 | 1 hr | 72 | 3 hr | | |
| 21D | 45 | 72 | 1 hr | 72 | 3 hr | | |
| 21E | 45 | 72 | 1 hr | 72 | 3 hr | | |
| 21F | 45 | 72 | 1 hr | 72 | 3 hr | | |
| 22A | 45 | 72 | 1 hr | 72 | 3 hr | | |
| 22B | 45 | 72 | 1 hr | 72 | 3 hr | | |
| 22C | 45 | 72 | 1 hr | 72 | 3 hr | | |
| 22D | 45 | 72 | 1 hr | 72 | 3 hr | | |
| 22E | 45 | 72 | 1 hr | 72 | 3 hr | | |
| 22F | 45 | 72 | 1 hr | 72 | 3 hr | | |
| 23A | 45 | 72 | 1 hr | 72 | 1 hr | | |
| 23B | 45 | 72 | 1 hr | 72 | 4 hr | | |
| 24A | 45 | 72 | 1 hr | 72 | 2 hr | | |
| 24B | 45 | 72 | 1 hr | 72 | 2 hr | | |
| 24C | 45 | 72 | 1 hr | 72 | 3 hr | | |
| 24D | 45 | 72 | 1 hr | 72 | 3 hr | | |
| 25A | 45 | 72 | 1 hr | 72 | 2 hr | | |
| 25B | 45 | 72 | 1 hr | 72 | 3 hr | | |
| 20A | 45 | 72 | 1 hr | 75 | 1 hr + 30 min post urea 3 | | |
| 20B | 45 | 72 | 1 hr | 75 | 2 hr + 30 min post urea 3 | | |
| 20C | 45 | 72 | 1 hr | 75 | 3 hr + 30 min post urea 3 | | |
| 21A | 45 | 72 | 1 hr | 72 | 3 hr | | |
| 21B | 45 | 72 | 1 hr | 72 | 3 hr | | |
| 21C | 45 | 72 | 1 hr | 72 | 3 hr | | |
| 21D | 45 | 72 | 1 hr | 72 | 3 hr | | |
| 21E | 45 | 72 | 1 hr | 72 | 3 hr | | |
| 21F | 45 | 72 | 1 hr | 72 | 3 hr | | |
| 22A | 45 | 72 | 1 hr | 72 | 3 hr | | |
| 22B | 45 | 72 | 1 hr | 72 | 3 hr | | |
| 22C | 45 | 72 | 1 hr | 72 | 3 hr | | |
| 22D | 45 | 72 | 1 hr | 72 | 3 hr | | |
| 22E | 45 | 72 | 1 hr | 72 | 3 hr | | |
| 22F | 45 | 72 | 1 hr | 72 | 3 hr | | |
| 23A | 45 | 72 | 1 hr | 72 | 1 hr | | |
| 23B | 45 | 72 | 1 hr | 72 | 4 hr | | |
| 24A | 45 | 72 | 1 hr | 72 | 2 hr | | |
| 24B | 45 | 72 | 1 hr | 72 | 2 hr | | |
| 24C | 45 | 72 | 1 hr | 72 | 3 hr | | |
| 24D | 45 | 72 | 1 hr | 72 | 3 hr | | |
| 25A | 45 | 72 | 1 hr | 72 | 2 hr | | |
| 25B | 45 | 72 | 1 hr | 72 | 3 hr | | |

TABLE 7

| Sample Number | Stability (22° C.) |
|---|---|
| 10A | ≤28 days |
| 10B | ≤28 days |
| 10C | 1 to 3 months |
| 10D | >3 months |
| 10E | >3 months |
| 11A | ≤28 days |
| 11B | ≤28 days |
| 12A | ≤28 days |
| 12B | ≤28 days |
| 13 | >3 months |
| 14 | >3 months |
| 15A | >3 months |
| 15B | >3 months |
| 15C | >3 months |
| 16A | >3 months |
| 16B | >3 months |
| 16C | >3 months |
| 16D | >3 months |
| 16E | >3 months |
| 17A | >3 months |
| 17B | >3 months |
| 17C | >3 months |
| 18A | >3 months |
| 18B | >3 months |
| 18C | >3 months |
| 18D | >3 months |
| 19A | >3 months |
| 19B | >3 months |
| 19C | >3 months |
| 20A | 1 to 3 months |

TABLE 7-continued

| Sample Number | Stability (22° C.) |
| --- | --- |
| 20B | 1 to 3 months |
| 20C | >3 months |
| 21A | 1 to 3 months |
| 21B | 1 to 3 months |
| 21C | 1 to 3 months |
| 21D | 1 to 3 months |
| 21E | 1 to 3 months |
| 21F | 1 to 3 months |
| 22A | 1 to 3 months |
| 22B | 1 to 3 months |
| 22C | 1 to 3 months |
| 22D | 1 to 3 months |
| 22E | 1 to 3 months |
| 22F | 1 to 3 months |
| 23A | ≤28 days |
| 23B | >3 months |
| 24A | >3 months |
| 24B | >3 months |
| 24C | >3 months |
| 24D | >3 months |
| 25A | >3 months |
| 25B | >3 months |
| 26A | 1 to 3 months |
| 26B | >3 months |
| 26C | >3 months |
| 26D | 1 to 3 months |
| 26E | 1 to 3 months |
| 26F | 1 to 3 months |
| 26G | >3 months |
| 26H | >3 months |
| 26I | >3 months |
| 26J | 1 to 3 months |
| 26K | >3 months |
| 26L | >3 months |
| 26M | 1 to 3 months |
| 26N | 1 to 3 months |
| 26O | 1 to 3 months |
| 26P | 1 to 3 months |
| 26Q | 1 to 3 months |

Tack Testing

Table 8 shows the results of tack testing performed on a Thwing Albert Vantage NX tensile testing machine. Tack is a measure of adhesion or "stickiness" of the material. For this test, the material is tested on its own. The higher the number the higher the tack, i.e., it is a stickier product.

TABLE 8

| Sample | Maximum Load |
| --- | --- |
| Sample A | 1.105 |
| CENTURO ® | 4.87 |
| CENTURO made with paraformaldehyde | 7.105 |

Analysis of the Structural Components

Sample 9 was characterized by Liquid chromatography-mass spectrometry (LC-MS). FIG. 1 depicts a portion of the LC-MS chromatogram for Sample 9 and Table 9 depicts retention times, peak area %, and possible corresponding structures for Sample 9.

TABLE 9

| Retention Time | Sample 9 (peak area %) | Possible Structure |
| --- | --- | --- |
| 3.8 | 60.84 | 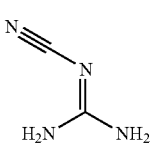 |
| 5.8 | 8.87 | 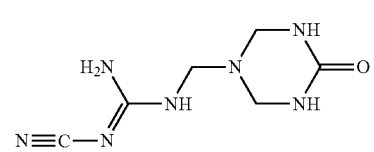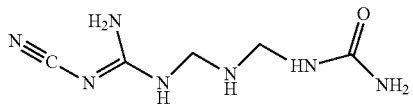 [SMILES: N#C/N=C(\N)NCNCNC(N)=O] |
| 7 | 10.8 | 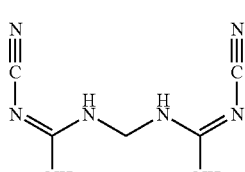 |

TABLE 9-continued
| Retention Time | Sample 9 (peak area %) | Possible Structure |
|---|---|---|
| 7.4 | 3.75 | 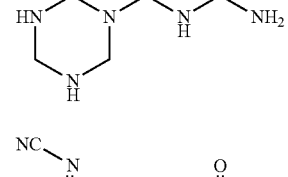 |
| 7.5 | n.d | 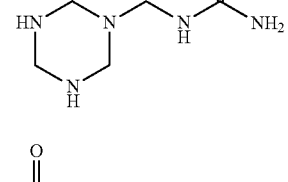 |
| 7.2-7.4 | 1.63 | 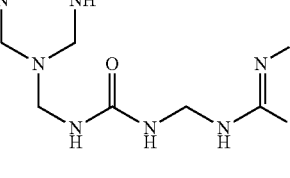 |
| 2.556 | 0.6 | 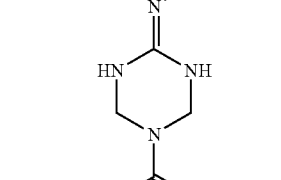 |
| 2.908 | 0.11 | 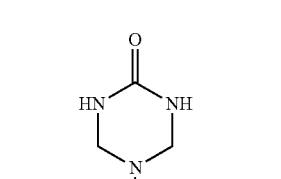 |

TABLE 9-continued

| Retention Time | Sample 9 (peak area %) | Possible Structure |
|---|---|---|
| 3.239 | 0.93 | 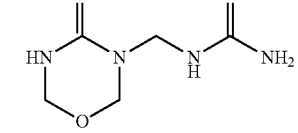 |
| 5.583 | 3.98 | 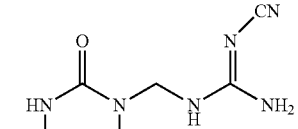 |
| 3.302 | 1.27 | 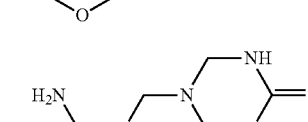 |
| 7.4 | non-zero | |
| 5.939 | 1.36 | 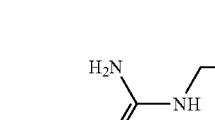 |
| 4.125 | 0.37 | n.d. |
| 4.433 | 0.31 | n.d. |
| 4.669 | 3.6 | 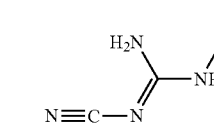 |
| 5.399 | 0.16 | n.d. |

UAN Treatment

Sample 1A was used to treat a urea ammonia nitrate solution (UAN-32) with a treatment rate of 2.5 gallons of Sample 1A per ton of UAN-32. This entailed adding 2.6 g of Sample 1A to 200 g of UAN. The sample was clear afterwards and remained clear for more than two months.

Sample 1B was used to treat a urea ammonia nitrate solution (UAN-32) with a treatment rate of 2.5 gallons of Sample 1B per ton of UAN-32. This entailed adding 2.6 g of Sample 1A to 200 g of UAN. The sample was clear afterwards and remained clear for more than two months.

Urea Treatment

Samples 4A and 4B were used to treat urea at a rate of 2, 3, and 4 qt/ton mixing with a ribbon blender for four minutes each at approximately 24 rpm. The urea blends flowed well from the blender and none looked "wet." Dye did not transfer to a paper towel when used to rub the treated urea. The treated urea was not sticky. Treatment of the urea did not change the crush strength of the urea granules. Treated urea compositions maintained good crush strength, flowability, and non-caking characteristics upon storage under ambient conditions. No caking was observed when treated urea compositions were stored for three months at ambient conditions. Urea compositions treated well even under warm and humid conditions. The dye enabled visual observation of coating uniformity. All formulations evenly coated the urea after 4 minutes at 24 rpm in a ribbon blender. Color was not transferred when the treated urea compositions were touched with a paper towel, thus indicating the coating quickly penetrated the urea surface and dried. Sample 7 was used to treat urea at the rates (quarts of Sample 7 per ton of urea) shown in Table 10.

TABLE 10

| Volume of Sample 7 (qt. equivalent) | Observation Fresh | Observation 24 Hr |
|---|---|---|
| 3 | Looks good, flows freely | Looks good, flows freely |
| 4 | Looks good, but a little sticky | Looks good, flows freely |
| 5 | Looks a little wet | Had a couple of chunks that broke up easily, then flowed well |
| 6 | Clumpy and wet | A little chunky but broke up easily |
| 7 | Really looking wet | Chunky, but broke up easily |
| 8 | Wet | Chunky, but broke up |
| 9 | Getting clumpy | Chunky, but broke up |
| 10 | Extremely clumpy and sticking to the blender a bit | Chunky, but broke up with increasing effort |
| 11 | So clumpy it looks "alive," sticking to the blender more, but still as individual granules | One solid chunk, but broke up with hard shaking |
| 12 | Almost a sludge, but not dissolving the urea. | Solid chunk that did not break up |
| 13 | Extremely sticky clumps | Solid chunk that did not break up |
| 14 | Getting even stickier clumps | Solid chunk that did not break up |
| 15 | Sticking all over the blender | Solid chunk that did not break up |
| 16 | Covering the inside of the blender | Solid chunk that did not break up |
| 16 + DE | Dried up a bit | Broke up and flowed after shaking |

We claim:

1. An agricultural composition comprising:
paraformaldehyde, a nitrification inhibitor, urea, an ammonia source, or a combination thereof and
one or more reaction products of a reaction among paraformaldehyde, a nitrification inhibitor, urea, and an ammonia source,
wherein the one or more reaction products is present in an amount of at least 20 wt. % of the total weight of the agricultural composition.

2. The agricultural composition according to claim 1, further comprising an organic solvent.

3. The agricultural composition according to claim 2, wherein the organic solvent comprises an alcohol.

4. The agricultural composition according to claim 3, wherein the alcohol is a glycol.

5. The agricultural composition according to claim 4, wherein the glycol is propylene glycol.

6. The agricultural composition according to claim 1, wherein the nitrification inhibitor is dicyandiamide.

7. The agricultural composition according to claim 1, wherein the one or more reaction products is a compound of Formula (I):

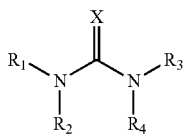

Formula (I)

wherein X is O or

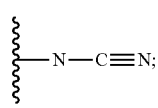

$R_1$, $R_2$, $R_3$, and $R_4$ are each independently:

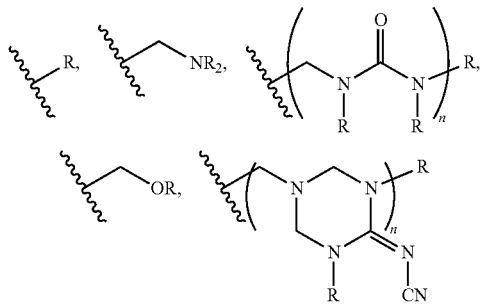

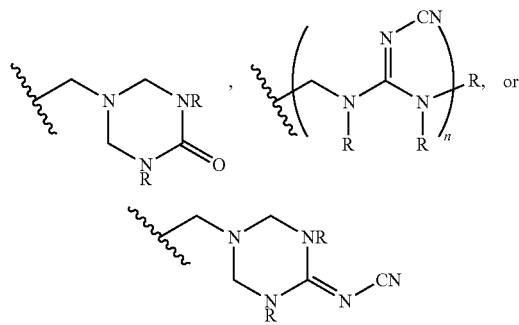

wherein each R is independently hydrogen, substituted or unsubstituted alkyl, or Y, and wherein Y is represented by:

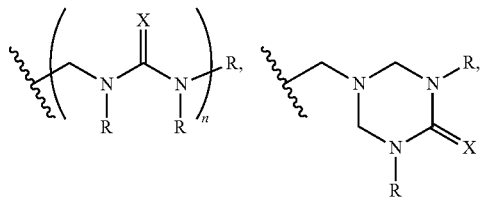

-continued

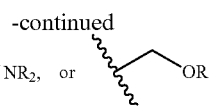

wherein X is O or

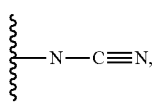

and wherein n is an integer from 0 to 100.

8. The agricultural composition according to claim 1, wherein the one or more reaction products is a compound of Formula (A), a compound of Formula (B), or a compound of Formula (C):

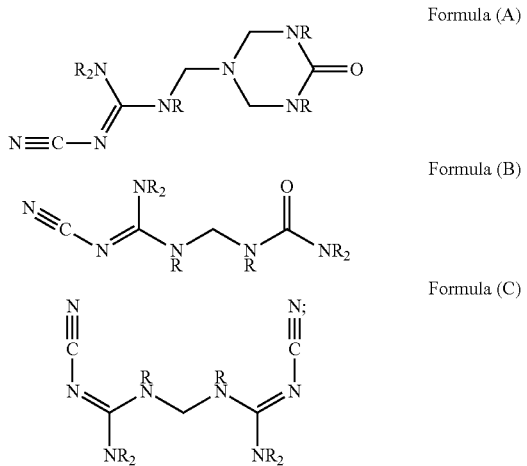

wherein each R is independently hydrogen, substituted or unsubstituted alkyl, or Y, and wherein Y is represented by:

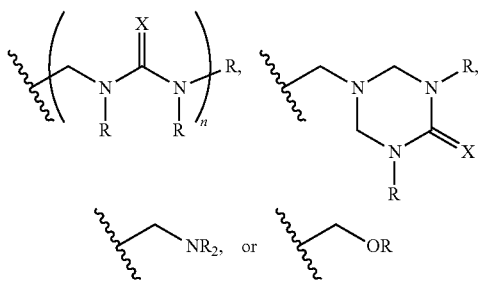

wherein X is O or

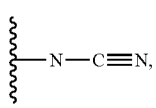

and wherein n is an integer from 0 to 100, preferably 0, 1, 2, or 3.

9. The agricultural composition according to claim 1, further comprising water, wherein the water content ranges from 10 wt. % to 30 wt. % of the total agricultural composition.

10. The agricultural composition according to claim 1, wherein the viscosity ranges from 15 cps to 1500 cps.

11. The agricultural composition according to claim 1, further comprising a dye.

12. A fertilizer composition comprising an agricultural composition according to claim 1 and a nitrogen source.

13. A process for preparing an agricultural composition comprising:
    reacting paraformaldehyde, a nitrification inhibitor, urea, an ammonia source, and optionally a solvent, to obtain one or more reaction products, wherein the resulting agricultural composition comprises at least 20 wt. % of the one or more reaction products based on the total weight of the agricultural composition.

14. A process for preparing an agricultural composition comprising:
    forming a first mixture comprising paraformaldehyde, a first amount of an ammonia source, a nitrification inhibitor, and a first amount of urea;
    heating the first mixture to a first temperature ranging from 65° C. to 85° C. for a first reaction time;
    adding to the first mixture a second amount of urea and, optionally second amount of an ammonia source, to form a second mixture; and
    heating the second mixture to a second temperature ranging from 65° C. to 85° C. for a second reaction time;
    wherein the resulting agricultural composition comprises one or more reaction products of a reaction among the paraformaldehyde, nitrification inhibitor, urea, and ammonia source and wherein the one or more reaction products is present in an amount of at least 20 wt. % of the total weight of the agricultural composition.

15. The process according to claim 14, wherein the paraformaldehyde is dissolved in a solvent.

16. The process of claim 15, wherein the solvent is water, an alcohol, ammonia, an aprotic organic solvent, or a combination thereof.

17. The process according to claim 16, wherein the solvent is propylene glycol.

18. The process according to claim 14, wherein the first reaction time ranges from 10 minutes to 3 hours.

19. The process according to claim 14, wherein the second reaction time ranges from 10 minutes to 10 hours.

20. The process according to claim 14, wherein the second amount of ammonia source is added and the first amount of ammonia source is from 10% to 50% of the second amount of ammonia source.

21. The process according to claim 14, wherein the second amount of ammonia source is added and the first amount of the urea is from 10% to 50% of the second amount of the urea.

22. The process according to claim 14, wherein the nitrification inhibitor is dicyandiamide.

23. The process according to claim 14, wherein a weight ratio of the paraformaldehyde to the urea ranges from 1:5 to 5:1.

24. The process according to claim 14, wherein a weight ratio of the paraformaldehyde to the ammonia source ranges from 1:1 to 20:1.

25. The process according to claim 14, wherein a weight ratio of paraformaldehyde to the nitrification inhibitor ranges from 1:5 to 5:1.

26. The process according to claim 14, wherein the one or more reaction products is a compound of Formula (I):

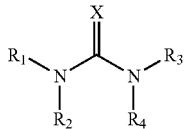

Formula (I)

wherein X is O or

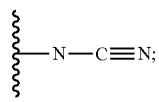

$R_1$, $R_2$, $R_3$, and $R_4$ are each independently:

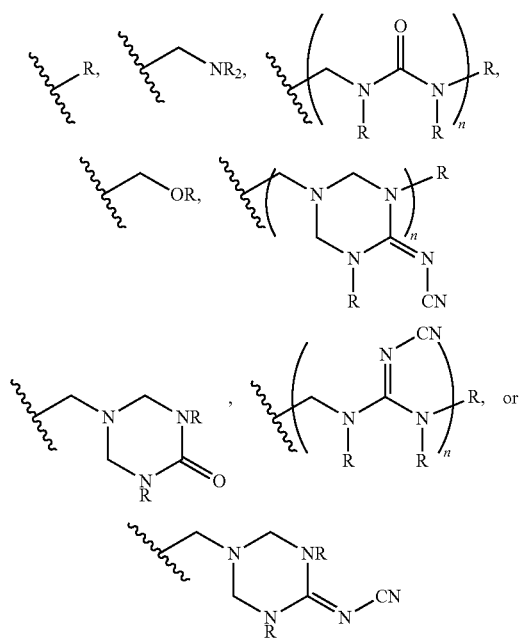

wherein each R is independently hydrogen, substituted or unsubstituted alkyl, or Y, wherein Y is represented by:

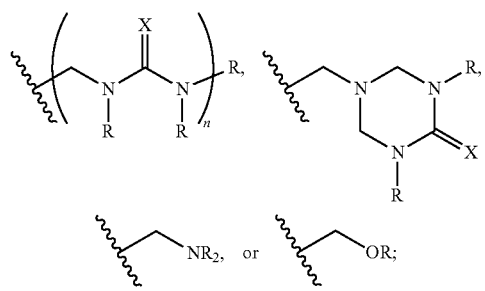

wherein X is O or

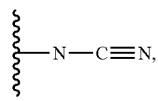

and wherein n is an integer from 0 to 100, preferably 0, 1, 2, or 3;

and wherein, if X is O, one or more of $R_1$, $R_2$, $R_3$, and $R_4$ is

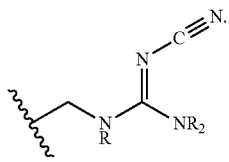

27. The process according to claim 14, wherein the one or more reaction products is a compound of Formula (A), a compound of Formula (B), or a compound of Formula (C):

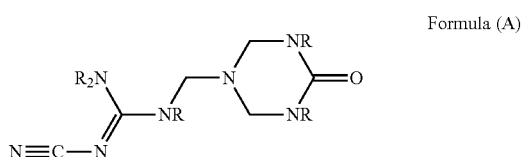

Formula (A)

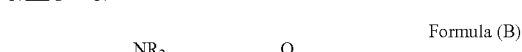

Formula (B)

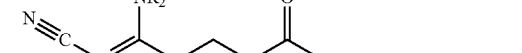

Formula (C)

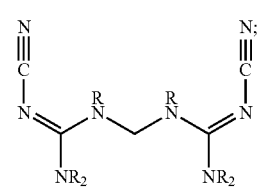

wherein each R is independently hydrogen, substituted or unsubstituted alkyl, or Y, wherein Y is represented by:

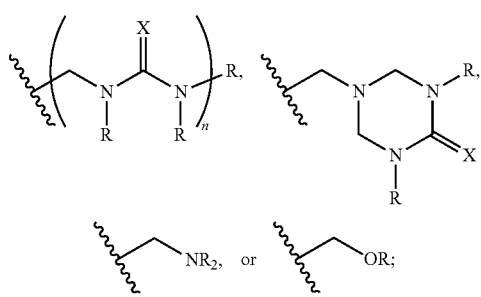

wherein X is O or
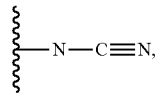
and wherein n is an integer from 0 to 100, preferably 0, 1, 2, or 3.
28. The process according to claim 14, further comprising adding a third amount of urea.
* * * * *